United States Patent
Uemura et al.

(10) Patent No.: US 10,129,780 B2
(45) Date of Patent: Nov. 13, 2018

(54) TERMINAL APPARATUS, BASE STATION APPARATUS, COMMUNICATION SYSTEM, MEASUREMENT METHOD, AND INTEGRATED CIRCUIT

(71) Applicant: Sharp Kabushiki Kaisha, Osaka-shi, Osaka (JP)

(72) Inventors: Katsunari Uemura, Osaka (JP); Hidekazu Tsuboi, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 14/914,557

(22) PCT Filed: Aug. 5, 2014

(86) PCT No.: PCT/JP2014/070566
§ 371 (c)(1),
(2) Date: Feb. 25, 2016

(87) PCT Pub. No.: WO2015/029712
PCT Pub. Date: Mar. 5, 2015

(65) Prior Publication Data
US 2016/0212645 A1 Jul. 21, 2016

(30) Foreign Application Priority Data
Aug. 29, 2013 (JP) .................................. 2013-177425

(51) Int. Cl.
*H04W 24/08* (2009.01)
*H04W 24/10* (2009.01)

(52) U.S. Cl.
CPC ........... *H04W 24/08* (2013.01); *H04W 24/10* (2013.01)

(58) Field of Classification Search
CPC .............................. H04W 24/08; H04W 24/10
(Continued)

(56) References Cited

U.S. PATENT DOCUMENTS

| 2011/0110254 A1* | 5/2011 | Ji | H04W 36/0066 370/252 |
| 2011/0281615 A1* | 11/2011 | Yamada | H04W 36/0094 455/524 |

(Continued)

FOREIGN PATENT DOCUMENTS

| JP | 2016-527830 A | 9/2016 |
| WO | 2015/018136 A1 | 2/2016 |

OTHER PUBLICATIONS

3GPP TS 36.331 VII.4.0, Jul. 4, 2013, pp. 80-100, 251-255 [online], [retrieved on Oct. 20, 2014], Retrieved from the Internet <URL:http://www.3gpp.org/ftp/Specs/archive/36_series/36.331/36331-b40.zip>.

(Continued)

*Primary Examiner* — Robert M Morlan
*Assistant Examiner* — Pamit Kaur
(74) *Attorney, Agent, or Firm* — Birch, Stewart, Kolasch & Birch, LLP

(57) ABSTRACT

Provided is a technique related to a terminal apparatus, a base station apparatus, a communication system, a control method, and an integrated circuit which perform cell measurements efficiently. In a case where a measurement event which sets frequencies of a plurality of serving cells as a measurement object is configured by measurement configuration, the terminal apparatus determines each of an evaluation object cell and a neighbor cell from the plurality of serving cells at a frequency of the measurement object based on the measurement configuration configured by the base station apparatus, and evaluates the measurement event by using a measurement result of the evaluation object cell.

5 Claims, 4 Drawing Sheets

(58) Field of Classification Search
USPC .......................................................... 370/252
See application file for complete search history.

(56) References Cited

U.S. PATENT DOCUMENTS

2013/0010763 A1* 1/2013 Chen ...................... H04L 5/001
                                                    370/331
2016/0157120 A1    6/2016 Shi et al.

OTHER PUBLICATIONS

NTT Docomo, Inc., "Deployment scenarios and design goals for dual connectivity", R2-130444, 3GPP TSG RAN WG2#81, Jan. 28-Feb. 1, 2013, St. Julian's, Malta, pp. 1-6.
Potevio, "Measurement in dual connectivity", 3GPP TSG-RAN WG2, Meeting #83, R2-132540, Aug. 9, 2013 [online], [retrieved on Oct. 20, 2014], Retrieved from the Internet <URL: http://www.3gpp.org/ftp/tsg_ran/wg2_r12/TSGR2_83/Docs/R2-132540.zip>.
Samsung, "Further ASN. 1 review related corrections", 3GPP TSG-RAN2 Meeting #65, R2-091700, Feb. 13, 2009 [online], [retrieved on Oct. 20, 2014], Retrieved from the Internet <URL:http://www.3gpp.org/ftp/tsg_ran/wg2_r12/TSGR2_65/Docs/R2-091700.zip>.

* cited by examiner

TERMINAL APPARATUS, BASE STATION APPARATUS, COMMUNICATION SYSTEM, MEASUREMENT METHOD, AND INTEGRATED CIRCUIT

TECHNICAL FIELD

Embodiments of the present invention relate to a technique of a terminal apparatus, a base station apparatus, a communication system, a measurement method, and an integrated circuit which perform cell measurements efficiently.

This application claims priority based on Japanese Patent Application No. 2013-177425 filed in Japan on Aug. 29, 2013, the content of which is incorporated herein.

BACKGROUND ART

In 3GPP (3rd Generation Partnership Project) which is a standardization project, standardization of Evolved Universal Terrestrial Radio Access (hereinafter referred to as EUTRA) is performed, in which high speed communication is realized by adopting an OFDM (Orthogonal Frequency-Division Multiplexing) communication scheme and flexible scheduling with a predetermined frequency and time unit called a resource block.

Moreover, in the 3GPP, a discussion on Advanced EUTRA that realizes higher-speed data transmission and has a backward compatibility with the EUTRA has been carried out. In the EUTRA, a network in which base station apparatuses are composed of substantially the same cell configurations (cell sizes) is mainly premised, but in the Advanced EUTRA, a network (Heterogeneous Network) in which base station apparatuses (cells) having different configurations are mixed in the same area is premised, and a discussion has been carried out on a communication system corresponding thereto.

In a communication system in which cells (macro cells) having a large cell radius and cells (small cells) having a smaller cell radius than that of the macro cells coexist like the heterogeneous network, a technique that a terminal apparatus performs communication by connecting to a plurality of cells at the same time (dual connectivity) is being discussed (NPL 1).

Discussed in NPL 1 is dual connectivity between cells having the same frequency (co-channel scenario), as one of scenarios when a terminal apparatus realizes dual connectivity between a cell (macro cell) having a large cell radius (cell size) and a cell (small cell) having a small cell radius.

NPL 2 points out that when performing dual connectivity between cells having the same frequency, a terminal apparatus is difficult to uniquely determine a cell serving as a reference, for each of measurement events.

CITATION LIST

Non Patent Literature

NPL 1: R2-130444, NTT DOCOMO, INC., 3GPP TSG RAN2#81, St. Julian's, Malta, Jan. 28-Feb. 1, 2013. http://www.3gpp.org/ftp/tsg_ran/WG2_RL2/TSGR2_81/Docs/

NPL 2: R2-132540, Potevio, 3GPP TSG RAN2#83, Barcelona, Spain, Aug. 19-23, 2013. http://www.3gpp.org/ftp/tsg_ran/WG2_RL2/TSGR2_83/Docs/

SUMMARY OF INVENTION

Technical Problem

NPL 2 points out a problem that the terminal apparatus is difficult to uniquely determine a cell serving as a reference, for each of measurement events, but does not indicate any solution to this problem. That is, in a case where there are a plurality of serving cells which are connected at the same frequency, the terminal apparatus is difficult to uniquely determine a reference cell. Further, in a case where there are a plurality of serving cells which are connected at the same frequency, the terminal apparatus is difficult to discriminate serving cells and neighbor cells. When being allowed to communicate only with one serving cell simultaneously among serving cells having different frequencies, the terminal apparatus is difficult to uniquely determine a reference cell. In addition, in a case where there are a plurality of serving cells which are connected at the same frequency, a base station apparatus is difficult to correctly interpret contents of reports on measurement events, which are reported by the terminal apparatus.

Embodiments of the invention have been made in view of the aforementioned problems, and an object thereof is to provide a technique related to a terminal apparatus, a base station apparatus, a communication system, a measurement method, and an integrated circuit capable of performing cell measurements efficiently, to thereby solve at least one of the aforementioned problems.

Solution to Problem

In order to achieve the aforementioned object, the following means is taken. That is, a terminal apparatus in an embodiment of the invention is a terminal apparatus using a plurality of cells, in which in a case where a plurality of serving cells notified from a base station apparatus are configured, when a measurement event which sets at least one of frequencies of the plurality of serving cells as a measurement object is notified by measurement configuration, each of an evaluation object cell and a neighbor cell is determined from the plurality of serving cells at the frequency of the measurement object based on the measurement configuration, and the measurement event is evaluated by using a measurement result of the evaluation object cell which is determined.

Moreover, the terminal apparatus in the embodiment of the invention is the terminal apparatus using the plurality of cells in which a primary cell is regarded as the evaluation object cell and a serving cell other than the primary cell is regarded as the neighbor cell.

Moreover, the terminal apparatus in the embodiment of the invention is the terminal apparatus using the plurality of cells in which a serving cell specified by reporting configuration included in the measurement configuration is regarded as the evaluation object cell and a serving cell other than the serving cell which is specified is regarded as the neighbor cell.

Moreover, the terminal apparatus in the embodiment of the invention is the terminal apparatus using the plurality of cells in which a serving cell judged by information indicated by reporting configuration included in the measurement configuration is regarded as the evaluation object cell and a serving cell other than the serving cell which is specified is regarded as the neighbor cell.

Moreover, the terminal apparatus in the embodiment of the invention is the terminal apparatus using the plurality of cells in which a serving cell judged as performing communication currently is regarded as the evaluation object cell and a serving cell other than the serving cell judged as performing communication currently is regarded as the neighbor cell.

Moreover, the terminal apparatus in the embodiment of the invention is the terminal apparatus using the plurality of cells in which one serving cell of the plurality of serving cells is regarded as the evaluation object cell based on configuration notified from the base station apparatus, and a serving cell other than the evaluation object cell is regarded as the neighbor cell.

Moreover, the terminal apparatus in the embodiment of the invention is the terminal apparatus using the plurality of cells, which is the terminal apparatus using the plurality of cells, in which in a case where a measurement event associated with the event object cell is notified, the measurement event is evaluated by using a measurement result of the evaluation object cell.

In this manner, the terminal apparatus is able to uniquely distinguish the evaluation object cell and the neighbor cell, and to appropriately evaluate the measurement event by using the evaluation object cell and the neighbor cell.

Moreover, a base station apparatus in an embodiment of the invention is a base station apparatus for communicating with a terminal apparatus by using a plurality of cells, in which in a case of notifying the terminal apparatus of a plurality of serving cells, a measurement event which sets at least one of frequencies of the plurality of serving cells as a measurement object is notified by including in measurement configuration, the terminal apparatus is caused to evaluate the measurement event by using measurement results of an evaluation object cell and a neighbor cell which are respectively determined from the plurality of serving cells based on reporting configuration included in the measurement configuration, and a measurement report reported based on the reporting configuration included in the measurement configuration is received.

Moreover, the base station apparatus in the embodiment of the invention is the base station apparatus for communicating with the terminal apparatus by using the plurality of cells, in which a serving cell which is used as the evaluation object cell among the plurality of serving cells is specified by the measurement configuration.

In this manner, the base station apparatus is able to notify the terminal apparatus of the measurement configuration for uniquely distinguishing the evaluation object cell and the neighbor cell, and to receive the measurement report including the measurement result of the measurement event, in which the evaluation object cell and the neighbor cell are appropriately used, from the terminal apparatus.

Moreover, a communication system in an embodiment of the invention is a communication system in which a terminal apparatus communicates with a base station apparatus by using a plurality of cells, in which in a case of notifying the terminal apparatus of a plurality of serving cells, the base station apparatus notifies a measurement event, which sets at least one of frequencies of the plurality of serving cells as a measurement object, by including in measurement configuration, and receives a measurement report reported based on reporting configuration included in the measurement configuration, and the terminal apparatus determines each of an evaluation object cell and a neighbor cell from among the plurality of serving cells based on the measurement configuration associated with the measurement event, and evaluates the measurement event by using a measurement result of the evaluation object cell which is determined.

In this manner, in the communication system, the terminal apparatus is able to uniquely distinguish the evaluation object cell and the neighbor cell and to appropriately evaluate the measurement event by using the evaluation object cell and the neighbor cell, and the base station apparatus is able to notify the terminal apparatus of the measurement configuration for uniquely distinguishing the evaluation object cell and the neighbor cell, and to receive the measurement report which includes the measurement result of the measurement event, in which the evaluation object cell and the neighbor cell are appropriately used, from the terminal apparatus.

Moreover, a measurement method of a terminal apparatus in an embodiment of the invention is a measurement method of a terminal apparatus using a plurality of cells, including: a step of, in a case where a plurality of serving cells notified from a base station apparatus are configured, when a measurement event which sets at least one of frequencies of the plurality of serving cells as a measurement object is notified by measurement configuration, determining each of an evaluation object cell and a neighbor cell from the plurality of serving cells at a frequency of the measurement object based on the measurement configuration; and a step of evaluating the measurement event by using a measurement result of the evaluation object cell which is determined.

Moreover, a measurement method of a base station apparatus in an embodiment of the invention is a measurement method of a base station apparatus which communicates with a terminal apparatus by using a plurality of cells, including at least: a step of, in a case of notifying the terminal apparatus of a plurality of serving cells, notifying a measurement event, which sets at least one of frequencies of the plurality of serving cells as a measurement object, by including in measurement configuration; a step of causing the terminal apparatus to evaluate the measurement event by using measurement results of an evaluation object cell and a neighbor cell which are respectively determined from the plurality of serving cells based on reporting configuration included in the measurement configuration; and a step of receiving a measurement report reported based on the reporting configuration included in the measurement configuration.

Moreover, an integrated circuit of a terminal apparatus in an embodiment of the invention is an integrated circuit mounted in a terminal apparatus using a plurality of cells, in which the terminal apparatus is caused to exert at least a function of, in a case where a plurality of serving cells notified from a base station apparatus are configured, when a measurement event which sets at least one of frequencies of the plurality of serving cells as a measurement object is notified by measurement configuration, determining each of an evaluation object cell and a neighbor cell from the plurality of serving cells at a frequency of the measurement object based on the measurement configuration; and a function of evaluating the measurement event by using a measurement result of the evaluation object cell which is determined.

Moreover, an integrated circuit of a base station apparatus in an embodiment of the invention is an integrated circuit mounted in a base station apparatus using a plurality of cells, in which the base station apparatus is caused to exert at least a function of, in a case of notifying the terminal apparatus of a plurality of serving cells, notifying a measurement event, which sets at least one of frequencies of the plurality of serving cells as a measurement object, by including in measurement configuration; a function of causing a terminal apparatus to evaluate the measurement event by using measurement results of an evaluation object cell and a neighbor cell which are respectively determined from the plurality of serving cells based on reporting configuration included in the measurement configuration; and a function of receiving a measurement report based on the reporting configuration included in the measurement configuration.

In this specification, although each embodiment is disclosed in terms of a technique related to a terminal apparatus, a base station apparatus, a communication system, a measurement method, and an integrated circuit which perform cell measurements efficiently, a communication scheme which may be applied to each embodiment is not limited to EUTRA or a communication scheme having compatibility with EUTRA such as Advanced EUTRA.

For example, the technique described in this specification may be used in various communication systems using code division multiple access (CDMA), time division multiple access (TDMA), frequency division multiple access (FDMA), orthogonal FDMA (OFDMA), single carrier FDMA (SC-FDMA), and other access schemes. In addition, in this specification, a system and a network may be used synonymously.

Advantageous Effects of Invention

According to embodiments of the invention, it is possible to provide a technique related to a terminal apparatus, a base station apparatus, a communication system, a measurement method, and an integrated circuit capable of performing cell measurements efficiently.

DESCRIPTION OF EMBODIMENTS

Figure 1:
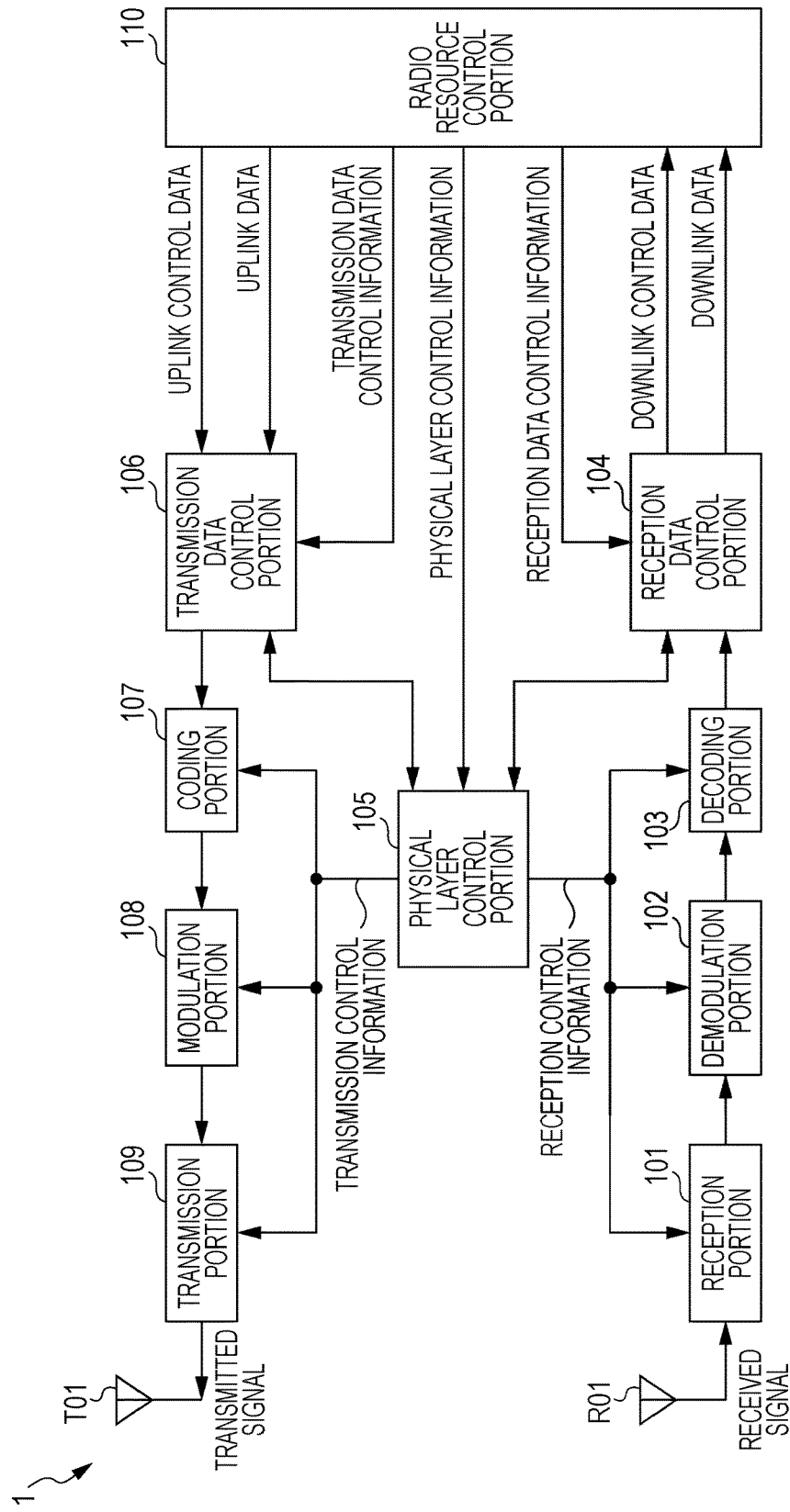
FIG. 1 is a block diagram illustrating one example of a schematic configuration of a terminal apparatus according to an embodiment of the invention.

A technique related to each embodiment of the invention will be briefly described below.
[Physical Channel/Physical Signal]

Description will be given for a physical channel and a physical signal which are primarily used in EUTRA and Advanced EUTRA. A channel means a medium used for signal transmission and reception, and a physical channel means a physical medium used for signal transmission and reception. In the invention, a physical channel and a signal may be used synonymously. There is a possibility that in the EUTRA and the Advanced EUTRA, a physical channel is added or a structure or a format style thereof is modified or added in the future, but even in the case of modification or addition, there is no influence on description of each embodiment of the invention.

In the EUTRA and the Advanced EUTRA, scheduling of the physical channel or the physical signal is managed by using a radio frame. One radio frame is 10 ms and one radio frame is configured by ten subframes. Further, one subframe is configured by two slots (that is, one subframe has 1 ms and one slot has 0.5 ms). Moreover, management is performed by using a resource block as a minimum unit of scheduling, in which physical channels are arranged. The resource block is defined as a fixed frequency domain in which a frequency axis is configured by an assembly of a plurality of subcarriers (for example, twelve subcarriers) and a domain configured by a fixed transmission time interval (one slot).

Synchronization signals are configured by three types of primary synchronization signals and secondary synchronization signals which are configured by 31 types of codes which are arranged alternately in a frequency domain, and a combination of signals of the primary synchronization signals and the secondary synchronization signals indicates 504 cell identifiers (physical cell ID (Physical Cell Identity; PCI)), which identify a base station apparatus, and a frame timing for radio synchronization. A terminal apparatus specifies a physical cell ID of synchronization signals received by cell search.

A physical broadcast channel (PBCH) is transmitted for the purpose of notifying (configuring) a control parameter (broadcast information (system information)) which is commonly used in terminal apparatuses in a cell. Regarding broadcast information which is not notified by the physical broadcast channel, a radio resource whose broadcast information is transmitted is notified to the terminal apparatus in a cell by a physical downlink control channel, and in the notified radio resource, a layer 3 message (system information) for notifying the broadcast information is transmitted by a physical downlink shared channel.

As the broadcast information, a cell global identifier (CGI) indicating an identifier of an individual cell, a tracking area identifier (TAI) for managing a standby area by paging, random access configuration information, transmission timing adjustment information, shared radio resource configuration information in the cell, neighbor cell information, uplink access restrict information or the like is notified.

Downlink reference signals are classified into a plurality of types depending on intended use thereof. For example, cell-specific RSs (cell-specific reference signals) are pilot signals which are transmitted with predetermined power for each cell, and are downlink reference signals which are iterated periodically in a frequency domain and a time domain based on a predetermined rule. The terminal apparatus measures reception quality of each cell by receiving the cell-specific RSs. Moreover, the terminal apparatus uses the downlink cell-specific RSs also as reference signals for demodulation of the physical downlink control channel or the physical downlink shared channel, which is transmitted at the same time with the cell-specific RSs. As a sequence used for the cell-specific RSs, a sequence which is identifiable for each cell is used.

The downlink reference signals are used also for estimation of channel fluctuation of the downlink. The downlink reference signals used for the estimation of channel fluctuation are referred to as channel state information reference signals (CSI-RSs). The downlink reference signals which are configured individually to the terminal apparatus are referred to as UE specific reference signals (URSs), or dedicated RSs (DRSs), and referred to for channel compensation processing of a channel when the physical downlink control channel or the physical downlink shared channel is demodulated.

The physical downlink control channel (PDCCH) is transmitted in several OFDM symbols (for example, 1 to 4 OFDM symbols) from beginning of each subframe. An enhanced physical downlink control channel (EPDCCH) is a physical downlink control channel which is arranged in an OFDM symbol in which the physical downlink shared channel PDSCH is arranged. The PDCCH or the EPDCCH is used for the purpose of notifying radio resource allocation information in accordance with scheduling of a base station apparatus and information for giving instruction of an adjustment amount of increase or decrease in transmit power to the terminal apparatus. Hereinafter, when simply described as the physical downlink control channel (PDCCH), it means both physical channels of the PDCCH and the EPDCCH unless otherwise specified.

The terminal apparatus needs to acquire radio resource allocation information called uplink grant in a case of transmission and downlink grant (downlink assignment) in the case of reception from the physical downlink control channel by monitoring the physical downlink control channel addressed to the terminal apparatus before transmitting or receiving a layer 3 message (paging, hand-over command, and the like) that is downlink data or downlink control data, and by receiving the physical downlink control channel addressed to the terminal apparatus. Note that, the physical downlink control channel may be configured so as to be, other than to be transmitted in the OFDM symbols described above, transmitted in a domain of a resource block allocated from the base station apparatus to the terminal apparatus in an individual (dedicated) manner.

A physical uplink control channel (PUCCH) is used for performing a reception confirmation response (ACK/NACK; Acknowledgement/Negative Acknowledgement) of data transmitted on the physical downlink shared channel, channel (channel state) information (CSI; Channel State Information) of the downlink, and a radio resource allocation request (radio resource request, scheduling request (SR)) of the uplink.

CSI includes a CQI (Channel Quality Indicator), a PMI (Precoding Matrix Indicator), a PTI (Precoding Type Indicator), and an RI (Rank Indicator). Each indicator may be described as indication.

The physical downlink shared channel (PDSCH) is used also for notifying the terminal apparatus of, in addition to the downlink data, broadcast information (system information), which is not notified by paging or the physical broadcast channel, as the layer 3 message. Radio resource allocation information of the physical downlink shared channel is indicated by the physical downlink control channel. The physical downlink shared channel is arranged and transmitted in the OFDM symbol other than the OFDM symbol in which the physical downlink control channel is transmitted. That is, the physical downlink shared channel and the physical downlink control channel are subjected to time division multiplexing in one subframe.

A physical uplink shared channel (PUSCH) mainly transmits uplink data and uplink control data, and may include control data such as reception quality of downlink and ACK/NACK. Moreover, it is used also for notifying the base station apparatus of uplink control information, in addition to the uplink data, as the layer 3 message from the terminal apparatus. Similarly to the downlink, radio resource allocation information of the physical uplink shared channel is indicated by the physical downlink control channel.

An uplink reference signal (also referred to as an uplink pilot signal or an uplink pilot channel) includes a demodulation reference signal (DMRS) which is used by the base station apparatus for demodulating the physical uplink control channel PUCCH and/or the physical uplink shared channel PUSCH, and a sounding reference signal (SRS) which is used by the base station apparatus mainly for estimating a channel state of the uplink.

As the sounding reference signal, there are a periodic sounding reference signal (Periodic SRS) which is transmitted periodically and an aperiodic sounding reference signal (Aperiodic SRS) which is transmitted when an instruction is given from the base station apparatus.

A physical random access channel (PRACH) is a channel which is used for notifying (configuring) a preamble sequence and has a guard time. The preamble sequence is configured so as to notify the base station apparatus of information by a plurality of sequences. For example, when sixty four types of sequences are prepared, it is possible to indicate 6-bit information to the base station apparatus. The physical random access channel is used as access means to the base station apparatus from the terminal apparatus.

The terminal apparatus uses the physical random access channel, for example, for making a radio resource request of the uplink when the physical uplink control channel is not configured, or requesting transmission timing adjustment information (also called timing advance (TA)) which is required for aligning an uplink transmission timing to a reception timing window of the base station apparatus to the base station apparatus. Moreover, the base station apparatus may request the terminal apparatus to initiate random access procedure by using the physical downlink control channel.

The layer 3 message is a message handled by a protocol of a control-plane (CP (C-Plane)) which is exchanged between RRC (radio resource control) layers of the terminal apparatus and the base station apparatus, and may be used synonymously with RRC signaling or an RRC message. Note that, against the control-plane, a protocol handling user data is referred to as a user-plane (UP (U-Plane)).

Note that, since physical channels or physical signals other than above are not concerned with each embodiment of the invention, detailed description thereof will be omitted. Examples of the physical channels or the physical signals whose description will be omitted include a physical control format indicator channel (PCFICH), a physical HARQ indicator channel (PHICH: Physical hybrid ARQ indicator channel), and a physical multicast channel (PMCH).

[Radio Network]

A communication available range (communication area) of each frequency which is controlled by the base station apparatus is regarded as a cell. In this case, respective communication areas covered by the base station apparatus may have different areas and different shapes for each frequency. Moreover, areas which are covered may be different for each frequency. A radio network in which cells which are different in types of base station apparatuses and sizes of cell radius are mixed in areas with the same frequency or different frequencies to form one communication system is referred to as a heterogeneous network.

The terminal apparatus operates by regarding inside of a cell as a communication area. When the terminal apparatus moves from a certain cell to another cell, the terminal apparatus moves to another suitable cell by cell re-selection procedure during non-radio connection (not under communication) or by handover procedure during radio connection (under communication). The suitable cell is generally determined as a cell to which access of the terminal apparatus is not prohibited based on information configured from the base station apparatus, and in which reception quality of the downlink fulfills a designated condition.

The base station apparatus manages a cell which is an area where the terminal apparatus may communicate with the base station apparatus for each frequency. One base station apparatus may manage a plurality of cells. A cell is classified into a plurality of types according to a size of an area (cell size) in which communication is allowed with the terminal apparatus. For example, a cell is classified into a macro cell and a small cell. The small cell is a cell which generally covers from several meters to several tens of meters of a radius. Further, the small cell is classified into a femto cell, a pico cell, a nano cell, and the like according to a size of an area thereof in some cases.

When the terminal apparatus is able to communicate with a certain base station apparatus, a cell which is configured so as to be used for communication with the terminal apparatus is a serving cell and other cells which are not used for the communication is referred to as a neighboring cell among cells of the base station apparatus.

[Primary Cell, Secondary Cell]

Moreover, a technique of aggregating frequencies (component carriers or frequency bands) of a plurality of different frequency bands and dealing with them as one frequency (frequency band) by carrier aggregation may be applied to the terminal apparatus and the base station apparatus. In the carrier aggregation, as the component carriers, there are an uplink component carrier corresponding to an uplink and a downlink component carrier corresponding to a downlink. In this specification, a frequency and a frequency band may be used synonymously.

For example, in case five component carriers each having a frequency bandwidth of 20 MHz are aggregated by the carrier aggregation, a terminal apparatus having capability which allows the carrier aggregation performs transmission and reception by regarding the aggregated component carriers to have a frequency bandwidth of 100 MHz. Note that, the component carriers which are aggregated may be contiguous frequencies or frequencies the entire or a part of which are not contiguous. For example, in case available frequency bands are an 800 MHz band, a 2 GHz band, and a 3.5 GHz band, a certain component carrier may be transmitted in the 800 MHz band, another component carrier may be transmitted in the 2 GHz band, and still another component carrier may be transmitted in the 3.5 GHz band.

It is also possible to aggregate a plurality of contiguous or non-contiguous component carriers in the same frequency band. The frequency bandwidth of each component carrier may be a frequency bandwidth (for example, 5 MHz or 10 MHz) narrower than a receivable frequency bandwidth (for example, 20 MHz) of the terminal apparatus, and respective frequency bandwidths for aggregation may be different from each other. It is desired that the frequency bandwidth is equal to any conventional frequency bandwidth of a cell by considering backward compatibility, but may have the frequency bandwidth different from the conventional frequency bandwidth of a cell.

Component carriers (carrier types) having non-backward compatibility may be aggregated by carrier aggregation. The component carrier having non-backward compatibility is also referred to as a new carrier type (NCT). Note that, the number of uplink component carriers allocated (configured, added) to the terminal apparatus by the base station apparatus is desired to be the same as or less than the number of downlink component carriers.

The terminal apparatus and the base station apparatus manage a cell that is constituted by a certain uplink component carrier and the downlink component carrier that is connected to this uplink component carrier in a cell-specific manner, as a primary cell (PCell). In addition, the terminal apparatus and the base station apparatus manage a cell that is constituted by a component carrier other than the primary cell as a secondary cell (SCell). A frequency of the primary cell is referred to as a primary frequency and a frequency of the secondary cell is referred to as a secondary frequency.

The terminal apparatus performs reception of a paging message, detection of updating broadcast information, initial access procedure, configuration of security information and the like in the primary cell, but they may not be performed in the secondary cell. The primary cell and the secondary cell are collectively referred to as serving cells.

Although the primary cell is out of the target of control of activation and deactivation (that is, the primary cell is always regarded as being activated), the secondary cell has states of the cell as activation and deactivation according to activity. Regarding the states of the cell, a state of being activated and a state of being deactivated are also referred to as an activated state and a deactivated state, respectively.

For the state of the cell (secondary cell), a change of the state may be explicitly designated (notified, instructed) from the base station apparatus, or the state may be changed based on timer information (secondary cell deactivation timer; deactivation timer) counting the time by the terminal apparatus for each component carrier (secondary cell) in some cases.

Note that, the carrier aggregation is communication with a use of a plurality of cells by using a plurality of component carriers (frequency bands), and is also referred to as cell aggregation. Note that, the terminal apparatus may be radio-connected to the base station apparatus through a relay station apparatus (or repeater) for each frequency. That is, the base station apparatus of the each embodiment of the invention may be substituted with a relay station apparatus.

[Dual Connectivity]

A basic structure (architecture) of the dual connectivity will be described. In the dual connectivity, a terminal apparatus is connected to a plurality of base station apparatuses simultaneously. The base station apparatuses are different base station apparatuses which respectively constitute a macro cell and a small cell. Further, the base station apparatuses are different base station apparatuses which respectively constitute a small cell and a different small cell. Such simultaneous connection of the terminal apparatus by using cells belonging to the plurality of base station apparatuses is referred to as the dual connectivity, and connection of the terminal apparatus and the base station apparatuses by using a technique for realizing the dual connectivity will be described by using expressions of "using the dual connectivity", "connection by the dual connectivity", or an expression synonymous with them. The cells which are connected may be operated at the same frequency or may be operated at different frequencies.

Note that, the carrier aggregation is different from connection by the dual connectivity in that a plurality of cells are managed by one base station apparatus and frequencies of the cells are different from each other, and that a backbone line speed of which is so high that influence of a delay does not need to be considered is used between the plurality of cells. In other words, the carrier aggregation is a technique for connecting one terminal apparatus and one base station apparatus through a plurality of cells, while the dual connectivity is a technique for connecting one terminal apparatus and a plurality of base station apparatuses through a plurality of cells.

In the terminal apparatus and the base station apparatuses, the technique applied to the carrier aggregation may be applied to the dual connectivity. For example, the terminal apparatus and the base station apparatuses may apply techniques of management (addition, deletion, modification or the like) of the primary cell and the secondary cell, a measurement method and a measurement event configuration, which correspond to the carrier aggregation, activation/deactivation, and the like, to cells connected by the dual connectivity.

A connection path between the base station apparatuses which constitute the cells connected by the dual connectivity is referred to as a base station interface N10. Further, the base station interface N10 is also referred to as an X2 interface or an Xn interface in the EUTRA.

Figure 5:
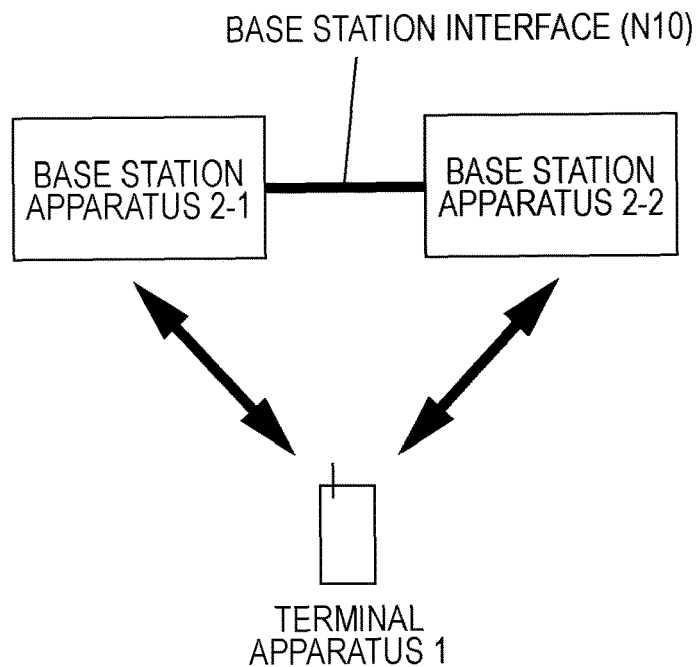
FIG. 5 is a view illustrating an example when the terminal apparatus and the base station apparatuses according to the embodiment of the invention are connected by using dual connectivity.

FIG. 5 is a view illustrating an example when a terminal apparatus 1 and base station apparatuses 2 are connected by using dual connectivity. The terminal apparatus 1 and the base station apparatuses 2 (the base station apparatus 2-1 and the base station apparatus 2-2) are respectively connected simultaneously through independent cells, and the terminal apparatus 1 is able to perform simultaneous reception and/or simultaneous transmission with respect to each of the base station apparatuses 2.

Figure 6:
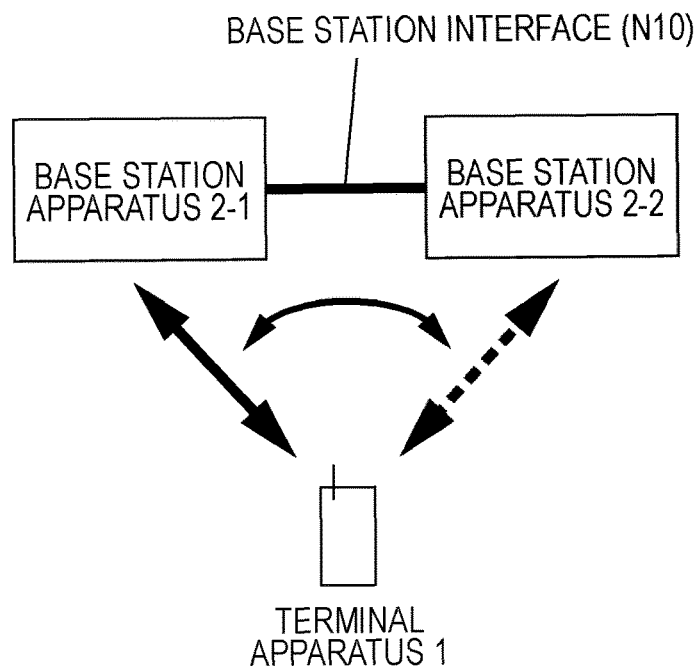
FIG. 6 is a view illustrating another example when the terminal apparatus and the base station apparatuses according to the embodiment of the invention are connected by using dual connectivity.

FIG. 6 is a view illustrating another example when the terminal apparatus 1 and the base station apparatuses 2 are connected by using dual connectivity. The terminal apparatus 1 and the base station apparatuses 2 (the base station apparatus 2-1 and the base station apparatus 2-2) are respectively connected simultaneously through independent cells, and the terminal apparatus 1 is able to perform reception and transmission with respect to either cell of the base station apparatuses 2. That is, when performing transmission and reception (communication) with the cell of the base station apparatus 2-1, the terminal apparatus 1 does not perform transmission and reception (communication) with the cell of the other base station apparatus 2-2. Note that, the transmission and reception in this case refers to transmission of individual scheduling to the terminal apparatus 1, and does not include reception of signals/channels which are common in the cells, such as a downlink synchronization signal, a downlink reference signal and broadcast information.

Moreover, although the present technique is called with a name of dual connectivity, the number of the base station apparatuses 2 connected to the terminal apparatus 1 is not limited to two, and the terminal apparatus 1 may be connected to three or more base station apparatuses 2.

[Measurement]

Next, a method of measurement control (measurement method) in the terminal apparatus will be described. The base station apparatus transmits measurement configuration by using a radio resource control connection reconfiguration (RRCConnectionReconfiguration) message to the terminal apparatus.

The terminal apparatus configures a measurement parameter included in the measurement configuration, and in accordance with the measurement parameter which is notified, performs measurements, event evaluation of a measurement event, and measurement reporting for a serving cell and a neighbor cell (including a listed cell and/or a detected cell). The listed cell is a cell which is listed in a measurement object(s) (cell in a neighbor cell list notified from the base station apparatus to the terminal apparatus), and the detected cell is a cell which is detected by the terminal apparatus on a frequency indicated by the measurement object and not listed in the measurement object (cell detected by the terminal apparatus itself).

As measurements, there are intra-frequency measurements, inter-frequency measurements, and inter-RAT (Radio Access Technology) measurements. The intra-frequency measurements are measurements on a downlink frequency of a serving cell. The inter-frequency measurements are measurements on a frequency different from the downlink frequency of the serving cell. The inter-RAT measurements are measurements with a radio access technology (RAT) which is different from a radio technology of the serving cell (for example, EUTRA).

The measurement configuration includes a measurement identifier (measId), a measurement object(s), reporting configuration(s), quantity configuration (quantityConfig), measurement gap configuration (measGapConfig), a serving cell quality threshold (s-Measure), and the like.

In the quantity configuration (quantityConfig), a layer 3 filtering coefficient (L3 filtering coefficient) is specified when the measurement object is the EUTRA. With the layer 3 filtering coefficient (L3 filtering coefficient), a ratio (rate) of filtering between a latest measurement result and a past measurement result is configured. A filtering result is used for event evaluation in the terminal apparatus. The event evaluation indicates judgement as to whether or not triggering criteria of the measurement event indicated by the reporting configuration, which is carried out in the terminal apparatus, is fulfilled.

In this case, the measurement identifier (measId) is used for linking (associating) the measurement object with the reporting configuration, and specifically, in the measurement configuration, the measurement identifier (measId), and one measurement object identifier (measObjectId) and one report configuration identifier (reportConfigId) which are linked are configured by the base station apparatus and notified to the terminal apparatus. In the measurement configuration, addition, correction or deletion may be performed for an associated relation (link) of the measurement identifier, the measurement object and the reporting configuration.

The measurement object is configured for each radio access technology (RAT) or frequency. As the reporting configuration, there are configuration to the EUTRA and configuration to the RAT other than the EUTRA.

The measurement object includes measurement object EUTRA (measObjectEUTRA) which is associated with the measurement object identifier, and the like. The measurement object identifier is an identifier which is used for identifying configuration of the measurement object. The configuration of the measurement object is performed for each radio access technology (RAT) or frequency as described above. In the measurement object EUTRA which is the measurement object for the EUTRA, information applied to an EUTRA cell with a corresponding frequency is configured. Further, the measurement object EUTRA with a different frequency is handled as a different measurement object and is separately assigned with a measurement object identifier.

The measurement object EUTRA (measObjectEUTRA) includes EUTRA carrier frequency information (eutra-CarrierInfo), a measurement bandwidth (measurementBandwidth), an offset frequency (offsetFreq), information about a neighbor cell list, information about a black list, and the like.

Next, information included in the measurement object EUTRA will be described. The EUTRA carrier frequency information indicates a frequency (carrier frequency) to be a measurement object. The measurement bandwidth indicates a measurement bandwidth which is common to all neighbor cells which operate on the carrier frequency configured as the measurement object. The offset frequency (offsetFreq) indicates a measurement offset value which is applied to the frequency to be the measurement object.

The reporting configuration includes report configuration EUTRA (reportConfigEUTRA) which is associated with the report configuration identifier (reportConfigId), and the like.

The report configuration identifier (reportConfigId) is an identifier which is used for identifying reporting configuration associated with measurements. In the report configuration EUTRA (reportConfigEUTRA) which is the reporting configuration for the EUTRA, triggering criteria of the measurement event reported by the measurement report message in the EUTRA is configured (defined).

The report configuration EUTRA (reportConfigEUTRA) includes an event identifier (eventId), a trigger quantity (triggerQuantity), a hysteresis, a time to trigger (timeToTrigger), a report quantity (reportQuantity), the maximum number of report cells (maxReportCells), a report interval (reportInterval), a report amount (reportAmount), and the like.

Next, the report configuration EUTRA (reportConfigEUTRA) will be described. The event identifier (eventId) is information for selecting criteria associated with event triggered reporting. In this case, the event triggered reporting indicates reporting a measurement result to the base station apparatus when reception quality (measurement result) of a cell has fulfilled triggering criteria of a measurement event which will be described below consecutively for a time to trigger. A method for reporting a measurement result a certain number of times at a constant interval when the triggering criteria of the measurement event has been fulfilled consecutively for the time to trigger is referred to as event triggered periodic reporting.

When judging that the triggering criteria in a certain measurement event has been fulfilled consecutively for the time to trigger, the terminal apparatus triggers (starts) transmission procedure of a measurement report message, and transmits the measurement report message including a measurement result to the base station apparatus. A trigger quantity (triggerQuantity) indicates a quantity used for evaluating the triggering criteria of the measurement event and specifies reference signal received power (RSRP) or reference signal received quality (RSRQ). That is, the terminal apparatus uses the quantity, which is specified as the trigger quantity (triggerQuantity), for a measurement result of a downlink reference signal, and decides whether or not the triggering criteria of the measurement event specified by the event identifier (eventId) is fulfilled.

As the triggering criteria of the measurement event, for example, an event A1 to an event A6 as follows are used for a cell of the EUTRA, and each of them has an entering condition and a leaving condition. When judging that the entering condition for the measurement event specified by the base station apparatus has been fulfilled consecutively for the time to trigger, the terminal apparatus triggers the transmission procedure of the measurement report message. On the other hand, when judging that the leaving condition for the measurement event which has fulfilled the entering condition has been fulfilled consecutively for the time to trigger, the terminal apparatus stops the transmission procedure of the corresponding measurement report message.

Note that, when a report on leave (reportOnLeave) is configured to the measurement event, the terminal apparatus triggers the transmission procedure of the measurement report message when the entering condition for the measurement event specified by the base station apparatus is fulfilled and the leaving condition is fulfilled.

<Event A1>
  Event A1 entering condition: Ms−Hys>a1_Threshold
  Event A1 leaving condition: Ms+Hys<a1_Threshold
<Event A2>
  Event A2 entering condition: Ms−Hys<a2_Threshold
  Event A2 leaving condition: Ms+Hys>a2_Threshold
<Event A3>
  Event A3 entering condition: Mn+Ofn+Ocn−Hys>Mp+Ofp+Ocp+a3_Offset
  Event A3 leaving condition: Mn+Ofn+Ocn+Hys<Mp+Ofp+Ocp+a3_Offset
<Event A4>
  Event A4 entering condition: Mn+Ofn+Ocn−Hys>a4_Threshold
  Event A4 leaving condition: Mn+Ofn+Ocn+Hys<a4_Threshold
<Event A5>
  Event A5 entering condition 1: Mp−Hys<a5_Threshold1
  Event A5 entering condition 2: Mn+Ofn+Ocn−Hys>a5_Threshold2
  Event A5 leaving condition 1: Mp+Hys>a5_Threshold1
  Event A5 leaving condition 2: Mn+Ofn+Ocn+Hys<a5_Threshold2
<Event A6>
  Event A6 entering condition: Mn+Ocn−Hys>Ms+Ocs+a6_Offset
  Event A6 leaving condition: Mn+Ocn+Hys<Ms+Ocs+a6_Offset Here, Ms denotes a measurement result for a serving cell (a primary cell or a secondary cell). Mp denotes a measurement result for a primary cell. Mn denotes a measurement result for a neighbor cell. The terminal apparatus evaluates each event by using the measurement result of the serving cell Ms, the measurement result of the primary cell Mp, or the measurement result of the neighbor cell Mn.

Hys denotes a hysteresis parameter for a target measurement event. Ofn denotes a frequency-specific measurement offset value for a frequency of a neighbor cell. Ocn denotes a cell-specific measurement offset value for a neighbor cell. Note that, when Ocn is not configured, the terminal apparatus sets the measurement offset value to 0 (zero).

Ofs denotes a frequency-specific offset value for a frequency of a serving cell. Ocs denotes a cell-specific offset value for a serving cell.

Ofp denotes a frequency-specific offset value for a frequency of a primary cell. Ocp denotes a cell-specific offset value for a primary cell.

a1_Threshold denotes a threshold parameter applied to the event A1. a2_Threshold denotes a threshold parameter applied to the event A2. a3_Offset denotes an offset parameter applied to the event A3. a4_Threshold denotes a threshold parameter applied to the event A4. a5_Threshold1 and a5_Threshold2 respectively denote threshold parameters applied to the event A5. a6_Offset denotes an offset parameter applied to the event A6.

Description will hereinafter be given in detail for appropriate embodiments of the invention with reference to accompanying drawings while considering above matters. Note that, in the description of the embodiments of the invention, when it is judged that specific description of known functions or configurations involved in the embodiments of the invention makes the subject matter of the embodiments of the invention unclear, the detailed description thereof will be omitted.

First Embodiment

A first embodiment of the invention will be described below.

FIG. 1 is a block diagram illustrating one example of a terminal apparatus 1 according to the first embodiment of the invention. This terminal apparatus 1 is composed of at least a receive antenna portion R01, a reception portion 101, a demodulation portion 102, a decoding portion 103, a reception data control portion 104, a physical layer control portion 105, a transmission data control portion 106, a coding portion 107, a modulation portion 108, a transmission portion 109, a transmit antenna portion T01, and a radio resource control portion 110. The "portion" in the figure is an element which realizes functions and each procedure of the terminal apparatus 1, which is represented also as a term of a section, a circuit, a configuration device, a device, a unit and the like.

The radio resource control portion 110 is a block which executes each function of an RRC (Radio Resource Control) layer which carries out, for example, state control, measurement control and report control, control of common control information and individual control information, connection control, movement control, and radio control for the terminal apparatus 1. The reception data control portion 104 and the transmission data control portion 106 are blocks which execute each function of an MAC (Medium Access Control) layer, an RLC (Radio Link Control) layer, and a PDCP (Packet Data Convergence Protocol) layer, which manage a data link layer.

Note that, the terminal apparatus 1 may have a configuration including a plurality of reception-based blocks (the reception portion 101, the demodulation portion 102 and the decoding portion 103) for supporting simultaneous reception of a plurality of frequencies (frequency bands, frequency bandwidths) or cells and a plurality of transmission-based blocks (the coding portion 107, the modulation portion 108 and the transmission portion 109) for supporting simultaneous transmission of a plurality of frequencies (frequency bands, frequency bandwidths) or cells by the carrier aggregation and/or the dual connectivity. The terminal apparatus 1 may have a configuration including a plurality of reception data control portions 104, a plurality of physical layer control portions 105, a plurality of transmission data control portions 106, and a plurality of radio resource control portions 110.

With regard to reception processing of the terminal apparatus 1, from the radio resource control portion 110, reception data control information is input to the reception data control portion 104, and physical layer control information which is a control parameter for controlling each block is input to the physical layer control portion 105. The physical layer control information is information which includes a parameter configuration required for radio communication control of the terminal apparatus 1, which is formed of reception control information and transmission control information.

The physical layer control information is configured by, for example, radio connection resource configuration, cell-specific broadcast information or a system parameter, which is transmitted in an individual (dedicated) manner from the base station apparatus 2 to the terminal apparatus 1, and input to the physical layer control portion 105 as necessary by the radio resource control portion 110. The physical layer control portion 105 appropriately inputs the reception control information which is control information about reception to the reception portion 101, the demodulation portion 102 and the decoding portion 103.

The reception control information includes, as downlink scheduling information, information such as information of a reception frequency band, a reception timing related to physical channels and physical signals, a multiplexing method, and radio resource arrangement information. The reception data control information is downlink control information including secondary cell deactivation timer information, DRX (Discontinuous Reception) control information, multi-cast data reception information, and downlink retransmission control information, and includes control information about each downlink of the MAC layer, the RLC layer, and the PDCP layer.

A reception signal is received by the receive antenna portion R01 and input to the reception portion 101. The reception portion 101 receives a signal from the base station apparatus 2 in accordance with a frequency and a frequency band which are designated by the reception control information. The reception portion 101 may include an RF circuit. The received signal is input to the demodulation portion 102. The demodulation portion 102 performs demodulation of the signal. The demodulation portion 102 inputs the demodulated signal to the decoding portion 103. The decoding portion 103 decodes the input signal and inputs each decoded data (downlink data and downlink control data) to the reception data control portion 104. An MAC control element transmitted from the base station apparatus 2 with each data is also decoded at the decoding portion 103 and input to the reception data control portion 104.

The reception data control portion 104 performs, for example, control for the physical layer control portion 105 based on the received MAC control element, buffering control for each decoded data, and error correction control (TIARA) for retransmitted data. Each data input to the reception data control portion 104 is input (transferred) to the radio resource control portion 110.

Moreover, with regard to transmission processing of the terminal apparatus 1, transmission data control information is input from the radio resource control portion 110 to the transmission data control portion 106, and physical layer control information which is a control parameter for controlling each block is input to the physical layer control portion 105. The physical layer control portion 105 appropriately inputs transmission control information, which is control information about transmission, to the coding portion 107, the modulation portion 108, and the transmission portion 109. The transmission control information includes, as uplink scheduling information, information such as coding information, modulation information, information of a transmission frequency band, a transmission timing related to physical channels and physical signals, a multiplexing method, and radio resource arrangement information.

The transmission data control information is uplink control information which includes DTX (Discontinuous Transmission) control information, random access configuration information, uplink shared channel information, logical channel priority information, resource request configuration information, cell group information, and uplink retransmission control information. The radio resource control portion 110 may configure plural pieces of random access configuration information respectively corresponding to a plurality of cells to the transmission data control portion 106. The radio resource control portion 110 manages transmission timing adjustment information and a transmission timing timer, which are used for adjustment of an uplink transmission timing, and manages a state of the uplink transmission timing (a transmission timing adjustment state or a transmission timing non-adjustment state) for each cell (or for each cell group, each TA group). The transmission timing adjustment information and the transmission timing timer are included in the transmission data control information.

Note that, when it is necessary to manage the state of a plurality of uplink transmission timings, the transmission data control portion 106 manages transmission timing adjustment information corresponding to an uplink transmission timing of each of the plurality of cells (or a cell group, a TA group). The resource request configuration information includes at least maximum transmission counter configuration information and radio resource request prohibit timer information. The radio resource control portion 110 may configure plural pieces of resource request configuration information respectively corresponding to a plurality of cells to the transmission data control portion 106.

Transmission data invoked at the terminal apparatus 1 (uplink data and uplink control data) is input to the transmission data control portion 106 at any timing from the radio resource control portion 110. At this time, the transmission data control portion 106 calculates a quantity of the input transmission data (uplink buffering quantity). Moreover, the transmission data control portion 106 has a function of discriminating whether the input transmission data is data belonging to a control-plane or data belonging to a user-plane.

When transmission data is input to the transmission data control portion 106, the transmission data control portion 106 stores the transmission data in an uplink buffer in the transmission data control portion 106 (not illustrated). The transmission data control portion 106 then judges whether a radio resource needed for transmission of the input transmission data is allocated to the terminal apparatus 1. Based on the allocation of the radio resource, the transmission data control portion 106 selects any one of a physical uplink shared channel PUSCH, a radio resource request using a physical uplink control channel PUCCH (scheduling request (SR)) and a radio resource request using a physical random access channel, and requests, to the physical layer control portion 105, control processing for transmitting the selected channel.

That is, in case that the radio resource has been already allocated and a state in which the transmission data may be transmitted by the physical uplink shared channel PUSCH has come, the coding portion 107 acquires, in accordance with an instruction of the radio resource control portion 110, the transmission data corresponding to the radio resource which has been allocated from the uplink buffer for coding, and inputs the resultant to the modulation portion 108. Alternatively, when the radio resource has not been allocated and a radio resource request by the physical uplink control channel is allowed, the coding portion 107 codes control data needed for transmission of the radio resource request by the physical uplink control channel in accordance with an instruction of the radio resource control portion 110 and inputs the resultant to the modulation portion 108.

Alternatively, when the radio resource has not been allocated and the radio resource request by the physical uplink control channel is not allowed, the coding portion 107 instructs the transmission data control portion 106 to start random access procedure. At this time, the coding portion 107 generates a preamble sequence, which is transmitted by the physical random access channel, based on random access configuration information input from the transmission data control portion 106. Moreover, the coding portion 107 appropriately codes each data in accordance with the transmission control information and inputs the resultant to the modulation portion 108.

The modulation portion 108 performs modulation processing appropriately based on a channel structure for transmitting each of coded data. The transmission portion 109 performs mapping of each data subjected to modulation processing to a frequency domain, converts a signal of the frequency domain into a signal of a time domain, and carries it on a carrier wave of a given frequency to perform power amplification. The transmission portion 109 further adjusts an uplink transmission timing in accordance with the transmission timing adjustment information for each cell (or for each cell group, for each TA group) input from the radio resource control portion 110. The transmission portion 109 may include an RF circuit. A transmission signal output from the transmission portion 109 is transmitted from the transmit antenna portion TOT. The physical uplink shared channel in which uplink control data is arranged may include, for example, a layer 3 message (radio resource control message; RRC message) in addition to user data.

In FIG. 1, though other components of the terminal apparatus 1 and a transmission path of data (control information) between the components are omitted, it is apparent that a plurality of blocks having other functions necessary for operation as the terminal apparatus 1 are included as components. For example, an NAS layer portion and an application layer portion, which carry out control with a core network, exist higher than the radio resource control portion 110.

The receive antenna portion R01 or the transmit antenna portion T01 is typically a multi-band antenna in a plane shape, and may be configured by adopting any antenna which is suitable for a mobile station apparatus capability, a form, an object and the like of the terminal apparatus 1. For example, each of them may be configured by a plurality of antenna portions or may have directivity, or the receive antenna portion R01 and the transmit antenna portion T01 may be integrated.

Figure 2:
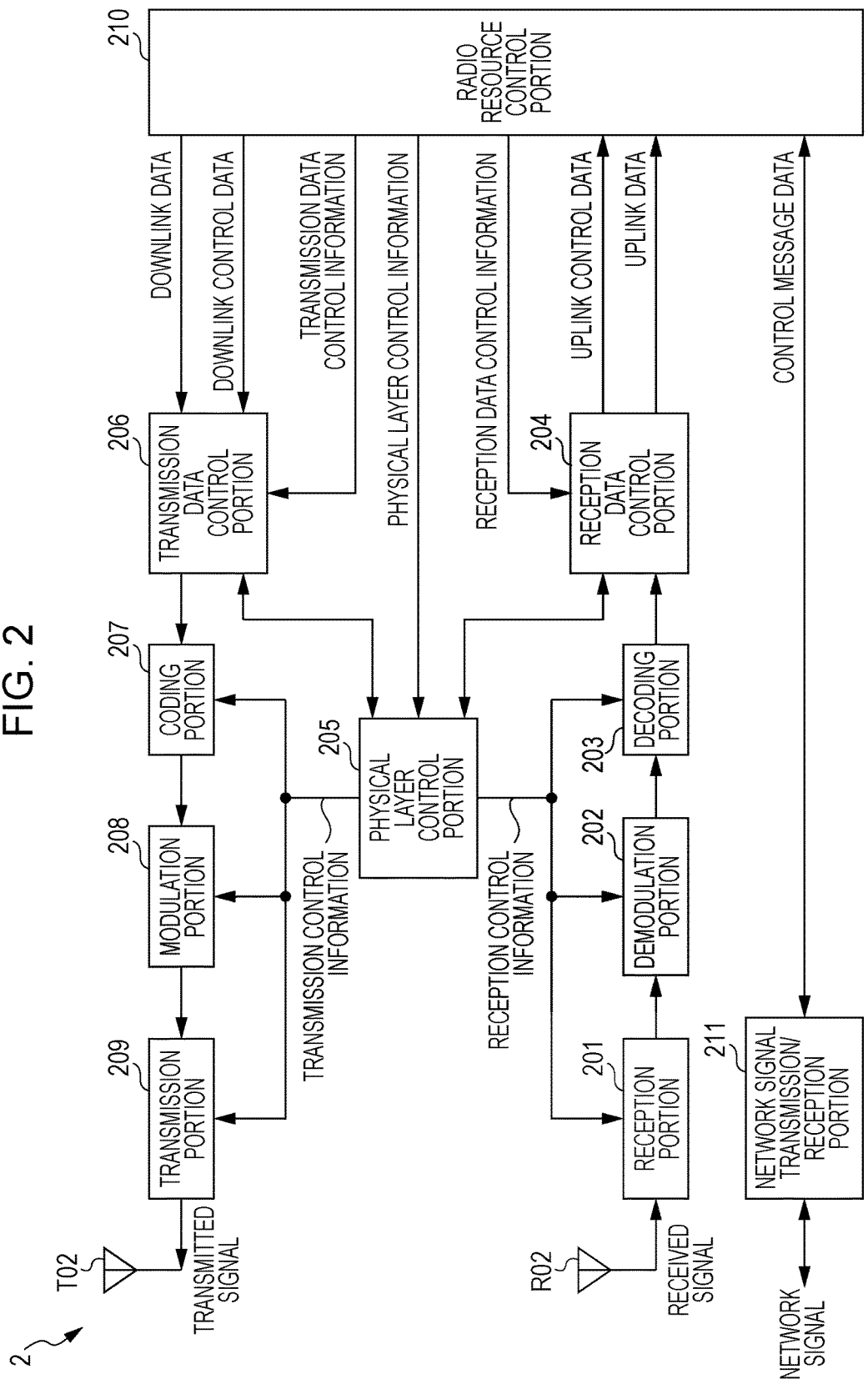
FIG. 2 is a block diagram illustrating one example of a schematic configuration of a base station apparatus according to the embodiment of the invention.

FIG. 2 is a block diagram illustrating one example of the base station apparatus 2 according to the first embodiment of the invention. The present base station apparatus is composed of at least a receive antenna portion R02, a reception portion 201, a demodulation portion 202, a decoding portion 203, a reception data control portion 204, a physical layer control portion 205, a transmission data control portion 206, a coding portion 207, a modulation portion 208, a transmission portion 209, a transmit antenna portion T02, a radio resource control portion 210, and a network signal transmission/reception portion 211. The "portion" in the figure is an element which executes functions and each procedure of the base station apparatus 2, which is represented also as a term of a section, a circuit, a configuration device, a device, a unit and the like.

The radio resource control portion 210 is a block executing each function of an RRC (Radio Resource Control) layer which carries out radio resource control of the base station apparatus 2. The reception data control portion 204 and the transmission data control portion 206 are blocks executing each function in an MAC (Medium Access Control) layer, an RLC (Radio Link Control) layer, and a PDCP (Packet Data Convergence Protocol) layer which manage a data link layer.

Note that, the base station apparatus 2 may have a configuration including a plurality of reception-based blocks (the reception portion 201, the demodulation portion 202 and the decoding portion 203) and a plurality of transmission-based blocks (the coding portion 207, the modulation portion 208 and the transmission portion 209) for supporting a plurality of frequencies (frequency bands, frequency bandwidths) by the carrier aggregation and/or the dual connectivity. It may have a configuration including a plurality of reception data control portions 204, a plurality of physical layer control portions 205, a plurality of transmission data control portions 206, a plurality of radio resource control portions 210, and a plurality of network signal transmission/reception portions 211.

The radio resource control portion 210 inputs downlink data and downlink control data to the transmission data control portion 206. When there is an MAC control element to be transmitted to the terminal apparatus 1, the transmission data control portion 206 inputs the MAC control element and each data (downlink data or downlink control data) to the coding portion 207. The coding portion 207 codes the MAC control element and each data, which are input, and inputs the resultant to the modulation portion 208. The modulation portion 208 performs modulation of a coded signal.

The signal modulated by the modulation portion 208 is input to the transmission portion 209. After mapping the input signal into a frequency domain, the transmission portion 209 converts the signal of the frequency domain into a signal of a time domain and performs power amplification by carrying it on a carrier wave of a given frequency. The transmission portion 209 may include an RF circuit. The transmission signal output from the transmission portion 209 is transmitted from the transmit antenna portion T02. A physical downlink shared channel in which the downlink control data is arranged typically configures a layer 3 message (RRC message).

A reception signal is received by the receive antenna portion R02 and input to the reception portion 201. The reception portion 201 converts the signal received from the terminal apparatus 1 into a base-band digital signal. When cells of a plurality of different transmission timings are configured to the terminal apparatus 1, the reception portion 201 receives a signal at different timings for each cell (or for each cell group, for each TA group). The digital signal converted at the reception portion 201 is input to the demodulation portion 202 and demodulated.

The signal demodulated at the demodulation portion 202 is subsequently input to the decoding portion 203. The decoding portion 203 decodes the input signal and inputs each decoded data (uplink data and uplink control data) to the reception data control portion 204. The MAC control element which is transmitted from the terminal apparatus 1 with each data is also decoded at the decoding portion 203 and input to the reception data control portion 204.

The reception data control portion 204 controls the physical layer control portion 205 based on the received MAC control element and buffers each decoded data to perform error correction control (HARM) for retransmitted data. Each data input to the reception data control portion 204 is input (transferred) to the radio resource control portion 210.

Physical layer control information needed for control of each of the blocks is information including parameter configuration needed for radio communication control of the base station apparatus 2, which is composed of reception control information and transmission control information. The physical layer control information is configured by a higher network apparatus (MME, a gateway apparatus (SGW), OAM or the like) or a system parameter, and input to the control portion 204 as necessary by the radio resource control portion 210.

The physical layer control portion 205 inputs the physical layer control information involved in transmission as the transmission control information to each of the blocks of the coding portion 207, the modulation portion 208 and the transmission portion 209, and inputs the physical layer control information involved in reception as the reception control information to each of the blocks of the reception portion 201, the demodulation portion 202 and the decoding portion 203.

The reception data control information includes control information about the uplink of the terminal apparatus 1, which corresponds to each of the MAC layer, the RLC layer, and the PDCP layer of the base station apparatus 2. The transmission data control information includes control information about the downlink of the terminal apparatus 1, which corresponds to each of the MAC layer, the RLC layer, and the PDCP layer of the base station apparatus 2. That is, the reception data control information and the transmission data control information are configured for each terminal apparatus 1.

The network signal transmission/reception portion 211 performs transmission (transfer) or reception of a control message or user data between the base station apparatuses 2 or between a higher network apparatus (MME, SGW) and the base station apparatus 2. In FIG. 2, though other components of the base station apparatus 2 and a transmission path of data (control information) between the components are omitted, it is apparent that a plurality of blocks having other functions necessary for operation as the base station apparatus 2 are included as components. For example, a radio resource management portion and an application layer portion exist on top of the radio resource control portion 210.

The receive antenna portion R02 or the transmit antenna portion T02 is typically a multi-band antenna in a plane shape, and may be configured by adopting any antenna which is suitable for a transmission capability, a form, an object and the like of the base station apparatus 2. For example, each of them may be configured by a plurality of antenna portions or may have directivity, or the receive antenna portion R02 and the transmit antenna portion T02 may be integrated. Further, the receive antenna portion R02 and the transmit antenna portion T02 (in which the reception portion 201 and the transmission portion 209 may be included) may be configured as one unit independent from the base station apparatus 2 (Remote Radio Head) so as to be arranged at a position different from that of the base station apparatus 2.

Figure 3:
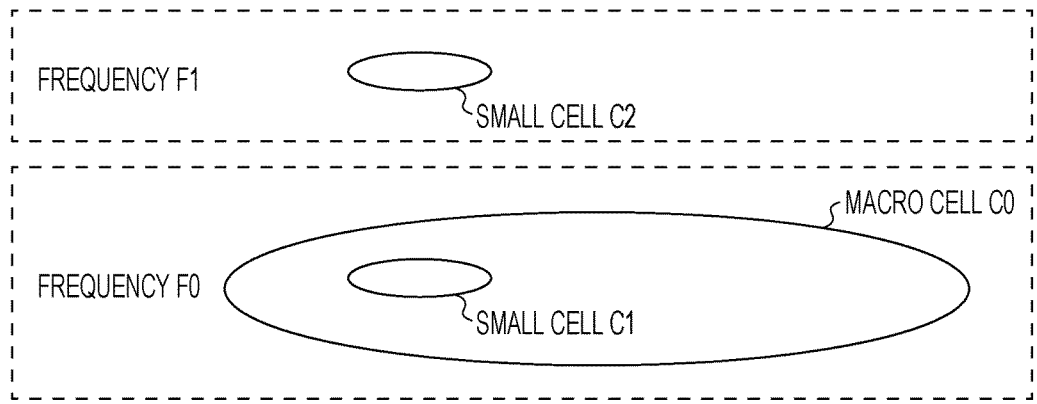
FIG. 3 is a view for explaining arrangement of cells according to the embodiment of the invention.

FIG. 3 is a view for explaining arrangement of a macro cell and small cells. A macro cell C0 is operated on a frequency F0 and a small cell C1 and a small cell C2 are respectively operated on the frequency F0 and a frequency F1. That is, by using the dual connectivity, the terminal apparatus 1 is able to be connected to the macro cell C0 and the small cell C1 on the frequency F0. Moreover, by using the dual connectivity, the terminal apparatus 1 is able to be connected to the macro cell C0 on the frequency F0 and the small cell C2 on the frequency F1.

It is assumed that when performing the dual connectivity using the cells of the same frequency (F0), the base station apparatus 2 and the terminal apparatus 1 use the macro cell C0 as a primary cell and the small cell C1 as a secondary cell. Further, it is assumed that when performing the dual connectivity using the cells of different frequencies (F0, F1), the base station apparatus 2 and the terminal apparatus 1 use the macro cell C0 as a primary cell and the small cell C2 as a secondary cell.

Figure 4:
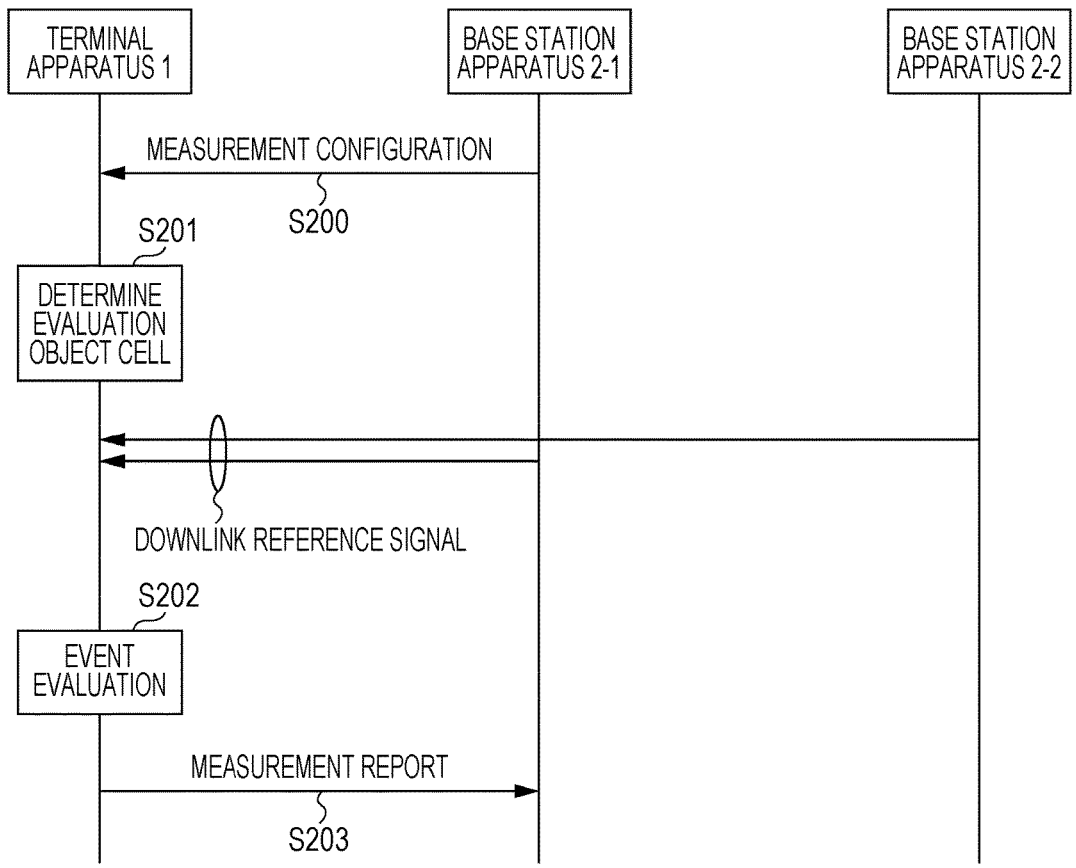
FIG. 4 illustrates one example of a sequence chart related to a measurement method of the terminal apparatus and base station apparatuses according to a first embodiment of the invention.

FIG. 4 illustrates one example of a sequence chart related to a measurement method of the terminal apparatus 1 and base station apparatuses 2 according to the first embodiment of the invention.

A base station apparatus 2-1 transmits a radio resource control connection reconfiguration message including measurement configuration to the terminal apparatus 1 (step S200). Note that, the measurement configuration may be transmitted from a base station apparatus 2-2.

Subsequently, the terminal apparatus 1 judges and determines an evaluation object cell (measurement reference cell) and a neighbor cell based on information of the measurement configuration received at step S201 and arrangement information of a frequency of a serving cell which is configured. The evaluation object cell indicates a cell for which a measurement result (Ms, Mp) used when performing event evaluation of a measurement event is calculated. On the other hand, the neighbor cell is a cell for which a measurement result (Mn) used when performing event evaluation of a measurement event is calculated. Note that, the terminal apparatus 1 does not regard, as the target of the event evaluation, a measurement result of a cell which is listed in a black list.

The terminal apparatus 1 evaluates each of the measurement events configured by using the measurement results of the evaluation object cell and/or the neighbor cell which are determined at step S201 (step S202). A method for evaluating measurement events may be the same as a conventional method. That is, the measurement result (Ms, Mp) of a downlink reference signal of the evaluation object cell and the measurement result (Mn) of a downlink reference signal of the neighbor cell are evaluated according to the measurement events. Note that, the terminal apparatus 1 evaluates the measurement events by additionally using an offset value and hysteresis as necessary. When transmission procedure of a measurement report message is triggered by the event evaluation, the terminal apparatus 1 generates a measurement report message and transmits the measurement report message to the base station apparatus 2-1 (step S203). Note that, the measurement report message may be transmitted to the base station apparatus 2-2.

An operation of the terminal apparatus 1 at step S201 will be described in detail.

<Event A1>

(a) In a case where there are a plurality of serving cells in a frequency indicated by a measurement object associated with this event (that is, in a case of a frequency of cells connected by the dual connectivity in the same frequency), a cell of the measurement result Ms is determined by the terminal apparatus 1 with a use of a method of any of (a1) a primary cell, (a2) a cell specified by the reporting configuration, (a3) a cell judged by a flag in the reporting configuration, (a4) a cell performing communication currently, (a5) an anchor cell, and (a6) a serving cell of the frequency of the measurement object. More specific description of (a1) to (a6) will be given below.

(a1) The terminal apparatus 1 uses the measurement result of the primary cell as Ms. This method is effective when the frequency indicated by the measurement object is a primary frequency. The terminal apparatus 1 does not regard a measurement result of a cell other than the primary cell, which is the cell of the primary frequency, as Ms.

(a2) As Ms, the terminal apparatus 1 uses the measurement result of the cell specified by the reporting configuration. The base station apparatus 2 transmits, to the terminal apparatus 1, the reporting configuration by including information for specifying a cell ID (or cell index) of the cell whose measurement result is used as Ms. Alternatively, the base station apparatus 2 may include the information for specifying a cell group (or TA group) in the reporting configuration so that a cell of the cell group at the frequency of the measurement object is used as Ms. The terminal apparatus 1 does not regard a measurement result of a cell other than the cell specified by the reporting configuration, as Ms.

(a3) As Ms, the terminal apparatus 1 uses the measurement result of the cell judged based on the flag in the reporting configuration. This method is effective when the frequency indicated by the measurement object is a primary frequency. The base station apparatus 2 transmits, to the terminal apparatus 1, the reporting configuration by including flag information of one bit. When the flag information is included, the terminal apparatus 1 uses, as Ms, the measurement result of a serving cell of the same frequency other than the primary cell. On the other hand, when the flag information is not included, the terminal apparatus 1 uses the measurement result of the primary cell as Ms. Alternatively, the base station apparatus 2 may include information by which any of a primary cell and a secondary cell is specified as flag information. The terminal apparatus 1 does not regard a measurement result of a cell other than the cell judged based on the flag in the reporting configuration, as Ms.

(a4) As Ms, the terminal apparatus 1 uses the measurement result of the cell performing communication currently. For example, the terminal apparatus 1 is not allowed to perform simultaneous reception or simultaneous transmission with a plurality of cells and is allowed only to perform transmission or reception with one cell, a measurement result of a cell which is judged as performing communication is used as Ms. For example, the terminal apparatus 1 may judge a cell, which performs communication, by using a condition of at least one of a cell for monitoring the PDCCH, a cell for transmitting a scheduling request (SR), a cell for performing CQI (CSI) reporting, a cell in which a path loss is calculated, and a cell corresponding to a reception subframe or transmission subframe (radio frame) specified by the base station apparatus 2. The terminal apparatus 1 does not regard a measurement result of a cell other than the cell performing communication currently, as Ms.

(a5) As Ms, the terminal apparatus 1 uses the measurement result of the anchor cell. The anchor cell is individually specified by the measurement configuration by the base station apparatus 2. The base station apparatus 2 may add information of one bit to the reporting configuration and specify as to whether or not to be a measurement event to be evaluated by using the anchor cell, individually for each measurement event. A difference from (a2) is that while (a2) is configured for each measurement event, only one anchor cell is configured for each terminal apparatus 1 (or for each measurement object). The anchor cell may be a primary cell, a secondary cell, or any cell other than a serving cell. The anchor cell may be specified by a cell ID or a cell index. The terminal apparatus 1 does not regard a measurement result of a cell other than the anchor cell as Ms.

(a6) As Ms, the terminal apparatus 1 uses the measurement result of the serving cell of the frequency of the measurement object. In a case where there are a plurality of serving cells in the same frequency, the terminal apparatus 1 uses all the measurement results thereof as Ms. In this case, since the base station apparatus 2 does not know which measurement result of the cell is used to evaluate the measurement event, the terminal apparatus 1 configures information for identifying a triggered cell to the measurement result in the measurement report message for reporting. The information for identifying the cell is, for example, a cell ID or a cell index.

(b) In a case where there is only one serving cell of the frequency indicated by the measurement object associated with the present event, a cell of the measurement result Ms is determined by the terminal apparatus 1 by using a method of any of (b1) a serving cell of the frequency indicated by the measurement object and (b2) an anchor cell. More specific description of (b1) to (b2) will be given below.

(b1) As Ms, the terminal apparatus 1 uses the measurement result of the serving cell (a primary cell or a secondary cell) of the frequency indicated by the measurement object. The terminal apparatus 1 is does not regard a measurement result of a cell other than the serving cell of the frequency indicated by the measurement object, which is the cell of the same frequency as the serving cell of the frequency indicated by the measurement object, as Ms.

(b2) The terminal apparatus 1 uses the measurement result of the anchor cell as Ms. The anchor cell is individually specified with the measurement configuration by the base station apparatus 2. The base station apparatus 2 may add information of one bit to the reporting configuration and specify as to whether or not to be a measurement event to be evaluated by using the anchor cell, individually for each measurement event. The anchor cell may be a serving cell or any cell other than the serving cell. The terminal apparatus 1 does not regard a measurement result of a cell other than the anchor cell as Ms.

<Event A2>

The cell of the measurement result Ms in the event A2 is determined by the same operation as that of the event A1, so that the description thereof will be omitted.

<Event A3>

(c) In a case where there are a plurality of serving cells in a primary frequency, a cell of the measurement result Mp is determined by the terminal apparatus 1 by using a method of any of (c1) a primary cell, (c2) a cell specified by the reporting configuration, (c3) a cell judged by a flag in the reporting configuration, (c4) a cell performing communication currently, (c5) an anchor cell, and (c6) a serving cell of the primary frequency. More specific description of (c1) to (c6) will be given below.

(c1) The terminal apparatus 1 uses the measurement result of the primary cell as Mp. The terminal apparatus 1 does not regard a measurement result of a cell other than the primary cell as Mp.

(c2) As Mp, the terminal apparatus 1 uses the measurement result of the cell specified by the reporting configuration. The base station apparatus 2 transmits, to the terminal apparatus 1, the reporting configuration by including information for specifying a cell ID (or cell index) of the cell whose measurement result is used as Mp. Alternatively, the base station apparatus 2 may include information for specifying a cell group (or TA group) in the reporting configuration so that a cell of the cell group at the frequency of the measurement object is used as Mp. The terminal apparatus 1 does not regard a measurement result of a cell other than the cell specified by the reporting configuration, as Mp.

(c3) As Mp, the terminal apparatus 1 uses the measurement result of the cell judged based on the flag in the reporting configuration. The base station apparatus 2 transmits, to the terminal apparatus 1, the reporting configuration by including flag information of one bit. When the flag information is included, the terminal apparatus 1 uses, as Mp, the measurement result of a serving cell other than the primary cell in the same frequency. On the other hand, when the flag information is not included, the terminal apparatus 1 uses the measurement result of the primary cell as Mp. Alternatively, the base station apparatus 2 may include information by which any of a primary cell and a secondary cell is specified as flag information. The terminal apparatus 1 does not regard a measurement result of a cell other than the cell judged based on the flag in the reporting configuration, as Mp.

(c4) As Mp, the terminal apparatus 1 uses the measurement result of the cell performing communication currently. For example, the terminal apparatus 1 is not allowed to perform simultaneous reception or simultaneous transmission with a plurality of cells and is allowed only to perform transmission or reception with one cell, a measurement result of a cell which is judged as performing communication is used as Mp. For example, the terminal apparatus 1 may judge a cell, which performs communication, by using a condition of at least one of a cell for monitoring the PDCCH, a cell for transmitting a scheduling request (SR), a cell for performing CQI (CSI) reporting, a cell in which a path loss is calculated, and a cell corresponding to a reception subframe or transmission subframe specified by the base station apparatus 2. Note that, the base station apparatus 2 may specify a radio frame instead of the subframe. The terminal apparatus 1 does not regard a measurement result of a cell other than the cell performing communication currently as Mp.

(c5) The terminal apparatus 1 uses the measurement result of the anchor cell as Mp. The anchor cell is individually specified with the measurement configuration by the base station apparatus 2. The base station apparatus 2 may add information of one bit to the reporting configuration and specify as to whether or not to be a measurement event to be evaluated by using the anchor cell, individually for each measurement event. A difference from (c2) is that while (c2) is configured for each measurement event, only one anchor cell is configured for each terminal apparatus 1 (or for each measurement object). The anchor cell may be a primary cell, a secondary cell, or any cell other than a serving cell. The anchor cell may be specified by a cell ID or a cell index. The terminal apparatus 1 does not regard a measurement result of a cell other than the anchor cell as Mp.

(c6) As Mp, the terminal apparatus 1 uses the measurement result of the serving cell of the primary frequency. In a case where there are a plurality of serving cells in the primary frequency, the terminal apparatus 1 uses all the measurement results thereof as Mp. In this case, since the base station apparatus 2 does not know which measurement result of the cell is used to evaluate the measurement event, the terminal apparatus 1 configures information for identifying the cell used as Mp to the measurement result in the measurement report message for reporting. The information for identifying the cell is, for example, a cell ID or a cell index. Note that, when transmission procedure of a measurement report message is triggered by using the primary cell as Mp, the terminal apparatus 1 may not include the information for identifying the cell in the measurement result. When the information for identifying the cell is not included in the measurement report message, the base station apparatus 2 may judge that the primary cell is used as Mp.

(d) In a case where are a plurality of serving cells in the primary frequency, the cell of the measurement result Mn is the cell in the frequency indicated by the measurement object and the cell which is not regarded as Mp in each of (c1) to (c5). Note that, in the case of (c6), the terminal apparatus 1 regards, as the cell of Mn, measurement results of remaining serving cells when a measurement result of a certain serving cell is regarded as Mp. That is, when evaluating the measurement event by using the measurement result of the primary cell as Mp, the terminal apparatus 1 may regard all the measurement results of the cells other than the primary cell as Mn.

(e) In a case where there is only one serving cell (only primary cell) in the primary frequency, the cell of the measurement result Mp is determined at the terminal apparatus 1 by using a method of any of (e1) a primary cell, (e2) a cell specified by the reporting configuration, (e3) a cell performing communication currently, and (e4) an anchor cell. More specific description of (e1) to (e4) will be given below.

(e1) The terminal apparatus 1 uses the measurement result of the primary cell as Mp. The terminal apparatus 1 does not regard a measurement result of a cell other than the primary cell as Mp.

(e2) As Mp, the terminal apparatus 1 uses the measurement result of the cell specified by the reporting configuration. The base station apparatus 2 transmits, to the terminal apparatus 1, the reporting configuration by including information for specifying a cell ID (or cell index) of the cell whose measurement result is used as Mp. The terminal apparatus 1 does not regard a measurement result of a cell other than the cell specified by the reporting configuration, as Mp.

(e3) As Mp, the terminal apparatus 1 uses the measurement result of the cell performing communication currently. For example, when the terminal apparatus 1 is not allowed to perform simultaneous reception or simultaneous transmission with a plurality of cells and is allowed only to perform transmission or reception with one cell, a measurement result of a cell which is judged as performing communication is used as Mp. The terminal apparatus 1 may judge a cell, which performs communication, by using a condition of at least one of a cell for monitoring the PDCCH, a cell for transmitting a scheduling request (SR), a cell for performing CQI (CSI) reporting, a cell in which a path loss is calculated, and a cell corresponding to a reception subframe or transmission subframe specified by the base station apparatus 2. The terminal apparatus 1 does not regard a measurement result of a cell other than the cell performing communication currently as Mp.

(e4) The terminal apparatus 1 uses the measurement result of the anchor cell as Mp. The anchor cell is individually specified with the measurement configuration by the base station apparatus 2. The base station apparatus 2 may add information of one bit to the reporting configuration and specify as to whether or not to be a measurement event to be evaluated by using the anchor cell, individually for each measurement event. A difference from (e2) is that while (e2) is configured for each measurement event, only one anchor cell is configured for each terminal apparatus 1 (or for each measurement object). The anchor cell may be a primary cell, a secondary cell, or any cell other than a serving cell. The anchor cell may be specified by a cell ID or a cell index. The terminal apparatus 1 does not regard a measurement result of a cell other than the anchor cell as Mp.

(f) In a case where there is only one serving cell (only primary cell) in the primary frequency, the cell of the measurement result Mn is the cell in the frequency indicated by the measurement object and the cell which is not regarded as Mp in each of (e1) to (e4).

<Event A4>

(g) In a case where there are a plurality of serving cells in the frequency indicated by the measurement object associated with the present event, the cell of the measurement result Mn is the cell in the frequency indicated by the measurement object and the cell which is not regarded as Ms in each of (a1) to (a5).

(h) In a case where there is only one serving cell of the frequency indicated by the measurement object associated with the present event, the cell of the measurement result Mn is the cell in the frequency indicated by the measurement object and the cell which is not regarded as Ms in each of (b1) to (b2).

<Event A5>

(i) The cell of the measurement result Mp in the event A5 is determined by the same operation as that of the event A3, so that the description thereof will be omitted.

(j) The cell of the measurement result Mn in the event A5 is determined by the same operation as that of the event A3, so that the description thereof will be omitted.

<Event A6>

(k) The cell of the measurement result Ms in the event A6 is determined by the same operation as that of the event A1, so that the description thereof will be omitted.

(l) The cell of the measurement result Mn in the event A6 is the cell which is not regarded as Ms in (k).

The configuration as described above allows the terminal apparatus 1 and the base station apparatus 2 to uniquely determine an evaluation object cell when connecting the cell of the base station apparatus 2-1 and the cell of the base station apparatus 2-2, so that it is possible to judge particularly a cell used as a target (used as a reference) when a measurement event is evaluated, which is a problem about a measurement method.

Even if there are a plurality of serving cells, the terminal apparatus 1 of the present embodiment is able to judge a reference cell for evaluation and a neighbor cell in accordance with a measurement event notified from the base station apparatus 2. Further, the terminal apparatus 1 is able to appropriately evaluate the configured measurement event by using a measurement result of the reference cell for evaluation and/or the neighbor cell and transmit a measurement report message based on the measurement result. In addition, even if there are a plurality of serving cells, the base station apparatus 2 of the present embodiment is able to cause the terminal apparatus 1 to judge the reference cell for evaluation and the neighbor cell. Further, the base station apparatus 2 is able to receive the measurement report message including the appropriate measurement result from the terminal apparatus 1.

According to the first embodiment, the terminal apparatus 1 is able to appropriately determine each of the evaluation object cell and the neighbor cell based on the measurement event and perform measurements, so that a measurement method becomes efficient. The base station apparatus 2 is able to transmit information for causing the terminal apparatus 1 to judge the evaluation reference cell and the neighbor cell based on the measurement event by including in measurement configuration, and thus able to provide the efficient measurement method to the terminal apparatus 1.

Second Embodiment

A second embodiment of the invention will be described below.

Although an anchor cell is introduced as one example of determining an evaluation object cell in the first embodiment, the terminal apparatus 1 is greatly influenced when the evaluation object cell is changed in an existing measurement event. Thus, the second embodiment indicates a method for configuring an individual event to an anchor cell to reduce the influence on the terminal apparatus 1.

Configurations of the terminal apparatus 1 and the base station apparatus 2 in the second embodiment may be the same configurations of the first embodiment, so that the description thereof will be omitted. However, the base station apparatus 2 of the second embodiment has a function of notifying the terminal apparatus 1 of measurement configuration related to a new event A7 described below, and a function of receiving a measurement report message related to the event A7. Moreover, the terminal apparatus 1 has a function of receiving and configuring the measurement configuration related to the event A7, and a function of performing measurements and event evaluation related to the event A7 and transmitting the measurement report message.

As trigger criteria of the measurement event, the new event A7 as follows is used.

<Event A7>

Event A7 entering condition: $Mn+Ofn+Ocn-Hys>Ma+Ofa+Oca+a7\_Offset$

Event A7 leaving condition: $Mn+Ofn+Ocn+Hys<Ma+Ofa+Oca+a7\_Offset$

Here, Ma denotes a measurement result of an anchor cell. Mn denotes a measurement result of a neighbor cell. The terminal apparatus 1 evaluates the event A7 by using the measurement result Ma of the anchor cell and the measurement result Mn of the neighbor cell.

The anchor cell is specified individually by measurement configuration from the base station apparatus 2. It is desired that only one anchor cell is configured for each terminal apparatus 1 (or for each measurement object). The anchor cell may be a primary cell, a secondary cell, or any cell other than a serving cell. The base station apparatus 2 may specify the anchor cell by the cell ID or the cell index. Moreover, the base station apparatus 2 may include information for specifying the anchor cell in a measurement object or reporting configuration. The terminal apparatus 1 evaluates the event by regarding a measurement result of a cell other than the anchor cell as Mn even if being a measurement result of the serving cell.

In report configuration EUTRA which is report configuration to the EUTRA, the base station apparatus 2 is able to configure identifier information indicating the event A7 as an event identifier (eventId), Hys, Ofn, Ocn, Oca and a7_Offset, a trigger quantity, a time to trigger, a report quantity, the maximum number of report cells, a report interval, a report amount, and the like for evaluating the event A7.

Hys denotes a hysteresis parameter for an event. Ofn denotes a frequency-specific measurement offset value for a frequency of a neighbor cell. Ocn denotes a cell-specific measurement offset value for a neighbor cell. When Ocn is not configured, the terminal apparatus 1 sets the measurement offset value to 0 (zero).

Ofa denotes a frequency-specific offset value for a frequency of the anchor cell. Oca denotes a cell-specific measurement offset value for the anchor cell. a7_Offset denotes an offset parameter applied to the event A7.

Note that, the base station apparatus 2 may configure a report on leave (reportOnLeave) to the event A7.

Based on information of the measurement configuration related to the event A7, which is received from the base station apparatus 2, the terminal apparatus 1 judges and determines the anchor cell and the neighbor cell which are evaluation object cells. Noe that, a measurement result of a cell which is listed in a black list is out of the target of the event evaluation.

The terminal apparatus 1 evaluates the event A7 by using the measurement result of the anchor cell and/or the neighbor cell. A method for evaluating the measurement event conforms to the formula described above. That is, the measurement event is evaluated by using an offset value and hysteresis in addition to a measurement result of a downlink reference signal of the anchor cell (Ma) and a measurement result of a downlink reference signal of the neighbor cell (Mn). When trigger criteria of the event A7 is fulfilled by the event evaluation and transmission procedure of a measurement report message is triggered, the terminal apparatus 1 generates a measurement report message and transmits the measurement report message to the base station apparatus 2-1. Note that, the measurement report message may be transmitted to the base station apparatus 2-2.

The terminal apparatus 1 may include, as the measurement result to be included in the measurement report message, a measurement identifier (measId) corresponding to the event A7, the measurement result of the anchor cell, a neighbor cell ID which fulfills the event A7 and a measurement result thereof, and a serving cell ID and a measurement result thereof. Note that, it is desired that the measurement result to be reported is any or both of RSRP and RSRQ.

By receiving the measurement report message from the terminal apparatus 1, the base station apparatus 2 is able to know whether the measurement event is fulfilled with respect to the anchor cell. The base station apparatus 2 is able to appropriately determine changing of the anchor cell, handover, changing of cell configuration of dual connectivity, changing of individual control information, changing of the measurement configuration, and the like based on the received measurement results and notify the terminal apparatus 1 of them.

The configuration as described above allows the terminal apparatus 1 and the base station apparatus 2 to uniquely determine an evaluation object cell as the anchor cell when connecting the cell of the base station apparatus 2-1 and the cell of the base station apparatus 2-2, so that it is possible to judge particularly a cell used as a target (used as a reference) when a measurement event is evaluated, which is a problem about a measurement method.

Even if there are a plurality of serving cells, the terminal apparatus 1 of the present embodiment is able to judge an evaluation reference cell and a neighbor cell by using cell information specified by the measurement event notified from the base station apparatus 2. Further, the terminal apparatus 1 is able to appropriately evaluate the measurement event configured by using the measurement result of the reference cell for evaluation and/or the neighbor cell, and transmit the measurement report message based on the measurement result. In addition, even if there are a plurality of serving cells, the base station apparatus 2 of the present embodiment is able to cause the terminal apparatus 1 to judge the reference cell for evaluation and the neighbor cell. Further, the base station apparatus 2 is able to receive the measurement report message including the appropriate measurement result from the terminal apparatus 1.

According to the second embodiment, the terminal apparatus 1 is able to appropriately determine each of the evaluation object cell and the neighbor cell based on the measurement event for the anchor cell and perform measurements, so that a measurement method becomes efficient. The base station apparatus 2 is able to transmit information for causing the terminal apparatus 1 to judge the evaluation reference cell and the neighbor cell based on the measurement event for the anchor cell by including in measurement configuration, and thus able to provide the efficient measurement method to the terminal apparatus 1.

Note that, the embodiments described above are only exemplifications, and may be realized by using various modified examples and substitution examples. For example, the uplink transmission scheme may be applied also to communication systems of both an FDD (frequency division duplex) scheme and a TDD (time division duplex) scheme. In addition, names of respective parameters (information) and respective events, which are indicated in the embodiments, are given for convenience of description, and even when names in practical use and names of the embodiments of the invention are different, there is no influence on the gist of the invention which is claimed by the embodiments of the invention.

"Connection" used in the each of the embodiments does not suggest to be limited only to a configuration in which a certain apparatus and a certain different apparatus are directly connected by using a physical line, and also includes a configuration of logical connection and a configuration of wireless connection by using wireless technologies.

The terminal apparatus 1 includes apparatuses having a communication function, such as not only a portable or movable mobile station apparatus, but also stationary or unmovable electronic equipment which is installed indoors and outdoors such as, for example, AV equipment, kitchen equipment, a cleaning/washing machine, air conditioning equipment, office equipment, an automatic vending machine, other domestic equipment, measurement equipment, an in-vehicle apparatus, and further, wearable equipment which is wearable, or healthcare equipment. Further, the terminal apparatus 1 is used not only for person to person or person to equipment communication, but also for equipment to equipment communication (Machine Type Communication), and apparatus to apparatus communication (D2D).

The terminal apparatus 1 is also referred to as a user terminal, a mobile station apparatus, a communication terminal, a moving body, a terminal, UE (User Equipment), or an MS (Mobile Station). The base station apparatus 2 is also referred to as a radio base station apparatus, a base station, a radio base station, a fixed station, NB (NodeB), eNB (evolved NodeB), a BTS (Base Transceiver Station), or a BS (Base Station).

Note that, the base station apparatus 2 is referred to as NB in UMTS which is prescribed by 3GPP, and as eNB in the EUTRA and the Advanced EUTRA. Note that, the terminal apparatus 1 in the UMTS prescribed by 3GPP, the EUTRA, and the Advanced EUTRA, is referred to as UE.

Further, though steps of a method, means or algorithm for realizing functions or a part of functions of each portion of the terminal apparatus 1 and the base station apparatuses 2 have been described specifically in combination by using functional block diagrams for convenience of description, they may be embodied directly in hardware, in a software module executed by a processor, or in a combination thereof.

If being implemented in hardware, the terminal apparatus 1 and the base station apparatus 2 may be configured by a feeding apparatus or a battery for supplying power to the terminal apparatus 1 and the base station apparatus 2, a display apparatus of a liquid crystal or the like and a display drive apparatus, a memory, an input/output interface and an input/output terminal, a speaker, or other peripheral apparatuses, in addition to the described configuration of the block diagram.

If being implemented in software, the function may be held or transmitted as one or more commands or codes on a computer readable medium. The computer readable media include both communication media and computer recording media including a medium that facilitates transferring a computer program from one place to another place.

Then, control of the terminal apparatus 1 and the base station apparatus 2 may be performed by recording one or more commands or codes in a computer readable recording medium and causing a computer system to read the one or more commands or codes recorded in this recording medium for execution. Note that, the "computer system" here is set to include an OS and hardware such as peripheral equipment.

Operations described in each of the embodiments of the invention may be realized by a program. The program which is operated at the terminal apparatus 1 and the base station apparatus 2 related to each of the embodiments of the invention is a program which controls a CPU or the like so as to realize the functions of the aforementioned embodiments related to each of the embodiments of the invention (program causing a computer to function). In addition, information handled in these apparatuses is temporarily accumulated in a RAM during processing thereof, and then stored in various ROMs or HDDs to be read out by the CPU as necessary, for correction and writing.

In addition, although the functions of the embodiments described above are realized by executing the program, the functions of each of the embodiments of the invention are also realized in some cases by performing processing based on instructions of the program in conjunction with an operating system, other application programs or the like.

Moreover, the "computer readable recording medium" refers to a portable medium such as a semiconductor medium (for example, such as a RAM or a nonvolatile memory card), an optical recording medium (for example, such as a DVD, an MO, an MD, a CD or a BD), a magnetic recording medium (for example, a magnetic tape or a flexible disk), or a storage device including a disc unit embedded in a computer system. Further, the "computer readable recording medium" includes one which dynamically holds a program for a short time, such as a communication line in a case where the program is transmitted through a network such as the Internet or a communication line such as a telephone line, and one which holds a program for a fixed time, such as a volatile memory inside a computer system serving as a server or a client in the above case.

The aforementioned program may be one for realizing a part of the functions described above, and further may be one capable of realizing the functions described above by being combined with a program which has been already recorded in a computer system.

Each functional block or various features of the terminal apparatus 1 and the base station apparatus 2 used in each of the embodiments described above may be implemented or executed by a general-purpose processor, a digital signal processor (DSP), an application specific integrated circuit (ASIC) or a general application integrated circuit (IC), a field programmable gate array signal (FPGA), or other programmable logic devices, discrete gates or transistor logic, a discrete hardware component, which is designed to execute the functions described in the present specification, or a combination thereof.

The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit.

The processor may be implemented also as a combination with a computing device. For example, a DSP and a microprocessor, a plurality of microprocessors, one or more microprocessors connected to a DSP core, or other such configurations are combined.

As above, the embodiments of the invention have been described specifically based on specific examples, however, it is clear that a gist of each embodiment and a scope of Claims of the invention are not limited to these specific examples, and design change and the like which are not departed from the gist of the invention are also included. That is, the description in the present specification aims to give exemplary description and does not give any limitation to each embodiment of the invention.

The invention can be modified in various manners within the scope defined by the Claims, and embodiments obtained by appropriately combining technical means disclosed in different embodiments are also encompassed by the technical scope of the invention. The configuration in which elements described in each of the aforementioned embodiments and achieving similar effects are replaced with each other is also encompassed in the technical scope of the invention.

INDUSTRIAL APPLICABILITY

The invention is able to be applied to a mobile phone, a personal computer, a tablet computer, and the like.

REFERENCE SIGNS LIST 1 terminal apparatus
2, 2-1, 2-2 base station apparatus
101, 201 reception portion
102, 202 demodulation portion
103, 203 decoding portion
104, 204 reception data control portion
105, 205 physical layer control portion
106, 206 transmission data control portion
107, 207 coding portion
108, 208 modulation portion
109, 209 transmission portion
110, 210 radio resource control portion
211 network signal transmission/reception portion
R01, R02 receive antenna portion
T01, T02 transmit antenna portion

The invention claimed is:

1. A terminal apparatus using a plurality of cells including a primary cell and a secondary cell, the terminal apparatus connected to a base station apparatus at least by the primary cell and to a second base station apparatus at least by the secondary cell, the terminal apparatus comprising:
first circuitry configured and/or programmed to:
configure the plurality of cells notified from the base station apparatus;
receive a measurement configuration including a measurement object configuration and a reporting configuration, the measurement object configuration indicating at least one of frequencies of the plurality of cells, the reporting configuration indicating at least one event and an anchor cell, the anchor cell being either one of the primary cell and the secondary cell;
evaluate a triggering criterion of the at least one event, the triggering criterion being a difference between a first sum and a hysteresis for the at least one event, the first sum being a sum of a measurement result for a neighbor cell and a first offset value for the neighbor cell, and the difference larger than a second sum of a measurement result for the anchor cell, a second offset value for the anchor cell, and a third offset value of the at least one event; and
transmit a measurement report to the base station apparatus, the measurement report including at least the measurement result for the neighbor cell and a cell ID for the neighbor cell, in a case that the measurement result for the neighbor cell meets the triggering criterion.

2. The terminal apparatus according to 1, wherein the first circuitry further configured and/or programmed to:
evaluate a second triggering criterion, the second triggering criterion being a third sum of the first sum and the hysteresis for the at least one event, the third sum smaller than the second sum; and
transmit the measurement report to the base station apparatus, in a second case that the measurement result for the neighbor cell meets the second triggering criterion.

3. A base station apparatus for communicating with a terminal apparatus by using a plurality of cells including a primary cell and a secondary cell, the terminal apparatus connected to the base station apparatus at least by the primary cell and to a second base station apparatus at least by the secondary cell, the base station apparatus comprising:
first circuitry configured and/or programmed to:
configure the plurality of cells to the terminal apparatus;
transmit a measurement configuration including a measurement object configuration and a reporting configuration, the measurement object configuration indicating at least one of frequencies of the plurality of cells the reporting configuration indicating at least one event and an anchor cell, the anchor cell being either one of a primary cell and a secondary cell indicating at least one event and an anchor cell, the anchor cell being either one of the primary cell and a secondary cell; and
receive a measurement report from the terminal, the measurement report including at least the measurement result for a neighbor cell and a cell ID for the neighbor cell, in a case the measurement result for the neighbor cell meets a triggering criterion,
the triggering criterion of the at least one event being a difference between a first sum and a hysteresis for the at least one event, the first sum being a sum of a measurement result for the neighbor cell and a first offset value for the neighbor cell, and the difference larger than a second sum of a measurement result for the anchor cell, a second offset value for the anchor cell, and a third offset value of the at least one event.

4. A measurement method of a terminal apparatus using a plurality of cells, the plurality of cells including a primary cell and a secondary cell, the terminal apparatus connected to a base station apparatus at least by the primary cell and to a second base station apparatus at least by the secondary cell, the method comprising at least:
configuring the plurality of cells notified from the base station apparatus;
receiving a measurement configuration including a measurement object configuration and a reporting configuration, the measurement object configuration indicating at least one of frequencies of the plurality of cells, the reporting configuration indicating at least one event and an anchor cell, the anchor cell being either one of the primary cell and the secondary cell;

evaluating a triggering criterion of the at least one event, the triggering criterion being a difference between a first sum and a hysteresis for the at least one event, the first sum being a sum of a measurement result for a neighbor cell and a first offset value for the neighbor cell, and the difference larger than a second sum of a measurement result for the anchor cell, a second offset value for the anchor cell, and a third offset value of the at least one event; and transmitting a measurement report to the base station apparatus, the measurement report including at least the measurement result for the neighbor cell and a cell ID for the neighbor cell, in a case that the measurement result for the neighbor cell meets the triggering criterion.

5. A measurement method of a base station apparatus which communicates with a terminal apparatus by using a plurality of cells including a primary cell and a secondary cell, the terminal apparatus connected to a base station apparatus at least by the primary cell and to a second base station apparatus at least by the secondary cell, the base station apparatus comprising at least:

setting the plurality of cells to the terminal apparatus;

transmitting a measurement configuration including a measurement object configuration and a reporting configuration, the measurement object configuration indicating at least one of frequencies of the plurality of cells, the reporting configuration indicating at least one event and an anchor cell, the anchor cell being either one of a primary cell and a secondary cell indicating at least one event and an anchor cell, the anchor cell being either one of the primary cell and a secondary cell; and receiving a measurement report from the terminal, the measurement report including at least the measurement result for a neighbor cell and a cell ID for the neighbor cell, in a case the measurement result for the neighbor cell meets a triggering criterion, the triggering criterion of the at least one event being a difference between a first sum and a hysteresis for the at least one event, the first sum being a measurement result for the neighbor cell and a first offset value for the neighbor cell, and the difference larger than a second sum of a measurement result for the anchor cell, a second offset value for the anchor cell, and a third offset value of the at least one event.

* * * * *